United States Patent [19]

Momoi et al.

[11] Patent Number: 5,310,396
[45] Date of Patent: May 10, 1994

[54] FLEXIBLE MANUFACTURING SYSTEM

[75] Inventors: Shoji Momoi; Kiyohisa Mizoguchi; Yasushi Nakamura, all of Aichi, Japan

[73] Assignee: Yamazaki Mazak Corporation, Japan

[21] Appl. No.: 753,942

[22] Filed: Sep. 3, 1991

[30] Foreign Application Priority Data

Apr. 9, 1990 [JP] Japan .................. 2-233892

[51] Int. Cl.⁵ ............ B23Q 3/155; B23Q 3/157
[52] U.S. Cl. ...................... 483/15; 29/33 P; 29/563; 483/20
[58] Field of Search .......... 29/33 P, 563; 483/5, 483/9, 15, 20

[56] References Cited

U.S. PATENT DOCUMENTS

| | | | |
|---|---|---|---|
| Re. 26,770 | 1/1970 | Lemelson | 29/33 P |
| 3,909,922 | 10/1975 | Takasaki et al. | 29/563 |
| 4,369,563 | 1/1983 | Williamson | 29/568 |
| 4,591,991 | 5/1986 | Sticht | 29/563 X |
| 4,641,414 | 2/1987 | Hiestand | 483/20 |
| 4,644,636 | 2/1987 | Link et al. | 483/20 |
| 4,809,426 | 3/1989 | Takeuchi et al. | 29/568 |
| 4,821,402 | 4/1989 | Kosho et al. | 483/3 |

FOREIGN PATENT DOCUMENTS

| | | |
|---|---|---|
| 3219460A1 | 12/1982 | Fed. Rep. of Germany . |
| 3706122A1 | 9/1988 | Fed. Rep. of Germany . |
| 3722524A1 | 12/1988 | Fed. Rep. of Germany . |
| 0126033 | 7/1983 | Japan .................. 483/15 |
| 59-232754 | 12/1984 | Japan . |
| 60-67005 | 4/1985 | Japan . |
| 60-201806 | 10/1985 | Japan . |
| 60-249943 | 12/1985 | Japan . |
| 61-103746 | 5/1986 | Japan . |
| 62-44363 | 2/1987 | Japan . |
| 62-54606 | 3/1987 | Japan . |
| 62-99041 | 5/1987 | Japan . |
| 63-105860 | 5/1988 | Japan . |
| 63-105876 | 5/1988 | Japan . |
| 63-102857 | 7/1988 | Japan . |
| 63-180451 | 7/1988 | Japan . |
| 1-159154 | 6/1989 | Japan . |
| 2-206806 | 8/1990 | Japan . |
| 2-269545 | 11/1990 | Japan . |
| 3-35962 | 2/1991 | Japan . |
| 3-66552 | 3/1991 | Japan . |
| 1593916 | 9/1990 | U.S.S.R. .................. 483/15 |

OTHER PUBLICATIONS

Abstract of JP Laid Open Patent 866552 dated Mar. 22, 1991.
Abstract of JP Laid Open Patent 3-35962 dated Feb. 15, 1991.
Abstract of JP Laid Open Patent 2-269545 dated Nov. 2, 1990.
Abstract of JP Laid Open Patent 2-206806 dated Aug. 16, 1990.
Abstract of JP Laid Open Patent 1-159154 dated Jun. 22, 1989.
Abstract of JP Laid Open Patent 63-180451 dated Jul. 25, 1988.

(List continued on next page.)

Primary Examiner—Z. R. Bilinsky
Attorney, Agent, or Firm—Beveridge, DeGrandi, Weilacher & Young

[57] ABSTRACT

A flexible manufacturing system which includes a stack yard, a machine tool and a stacker crane. In the stack yard, a pallet group, formed by stacking a number of pellets, is stored. The pallet group is transferred to a machine tool cell by the stacker crane. Each pallet has a memory, and data of the pallet itself and the member loaded on the pallet are memorized by the pallet. There are various kinds of members such as work-piece, tool and chuck jaw. These members are stored on exclusive pallets made for each kind of the member. Of the members, each tool and chuck jaw has its own memory and memorizes its own data. The data of all the memory can be read and written; therefore, the position of the pallet, tool and chuck jaw can be controlled at all times.

18 Claims, 25 Drawing Sheets

OTHER PUBLICATIONS

Abstract of JP Laid Open Patent 63-105876 dated May 11, 1988.
Abstract of JP Laid Open Patent 63-105860 dated May 11, 1988.
Abstract of JP Laid Open Patent 63-102857 dated May 7, 1988.
Abstract of JP Laid Open Patent 62-99041 dated May 8, 1987.
Abstract of JP Laid Open Patent 62-54606 dated Mar. 10, 1987.
Abstract of JP Laid Open Patent 62-44363 dated Feb. 26, 1987.
Abstract of JP Laid Open Patent 61-103746 dated May 22, 1986.
Abstract of JP Laid Open Patent 60-242943 dated Dec. 2, 1985.
Abstract of JP Laid Open Patent 60-201806 dated Oct. 12, 1985.
Abstract of JP Laid Open Patent 60-67005 dated Apr. 17, 1985.
Abstract of JP Laid Open Patent 59-232754 dated Dec. 27, 1984.

FIG. 8

| PALLET MEMORY DATA ITEMS ||
|---|---|
| PALLET NO. | WORK NO. <br> HAND NO. <br> HAND JAW NO. |
| WORK POSITION DATA | |
| NUMBER OF WORKS ON THE PALLET | TOOL NO. <br> HAND NO. |
| WORK PITCH | JAW NO. <br> HAND NO. |
| WORK DATA | |
| WORK NO. <br> MACHINING PROGRAM NO. <br> TRANSFER PROGRAM NO. | MAP OF WORK TOOL, JAW ON THE PALLET |
| PALLET-PIN DATA | WORK NO. <br> MEASURED POINTS <br> MEASURED DATA <br> YES / NO |
| MACHINING DATE | |
| NUMBER OF READ-WRITE | MACHINE NO. <br> SUPPLEMENT <br> SUPPLEMENTED TOOL NO. <br> SIZE <br> TOLERANCE, UPPER LIMIT, LOWER LIMIT <br> TARGET <br> TEMPERATURE WHEN MEASURED |

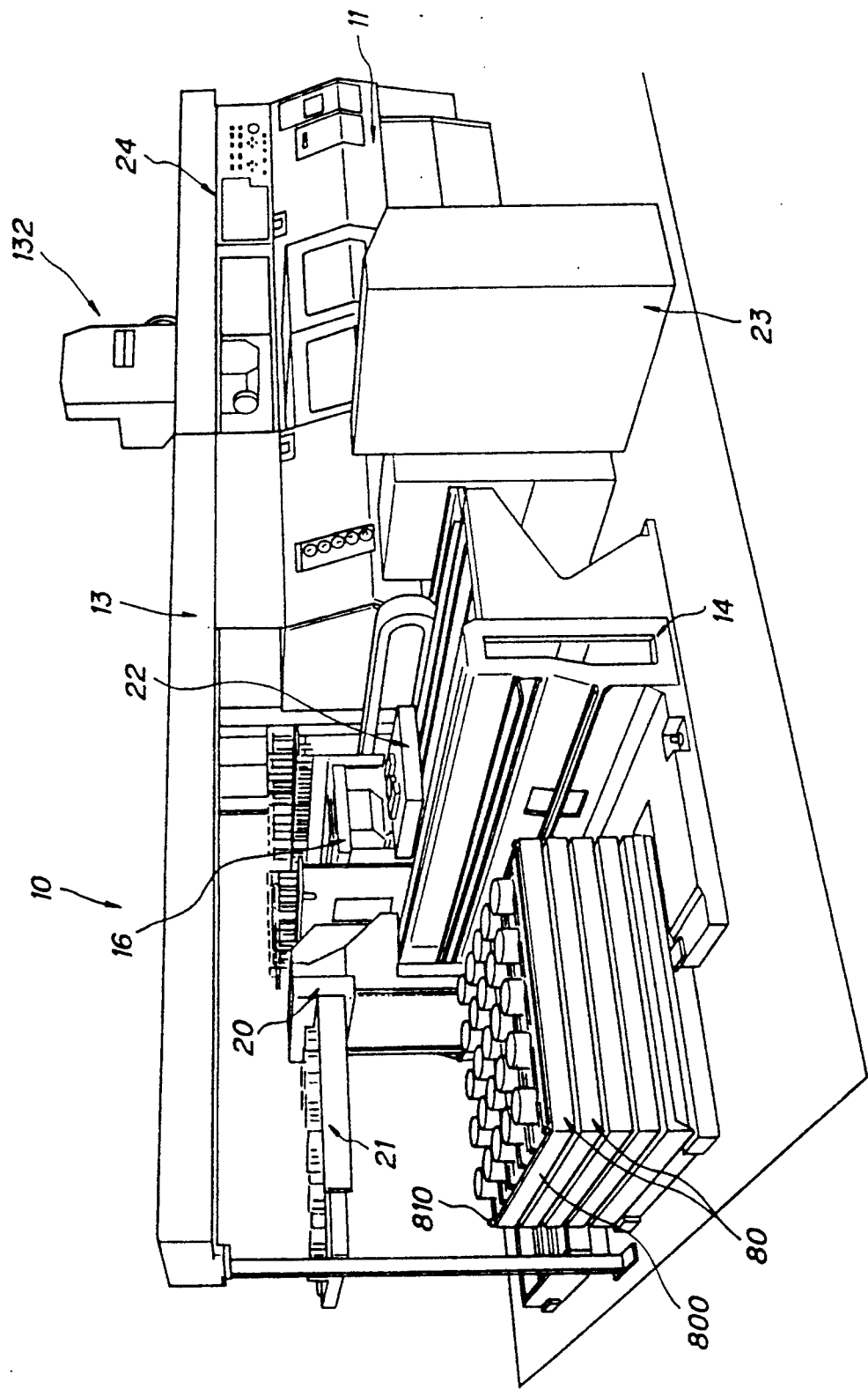

PALLET GROUP CONTROL TABLE

PALLET STATUS TABLE

TOOL CONTROL TABLE

JAW CONTROL TABLE

RELATION OF TABLES

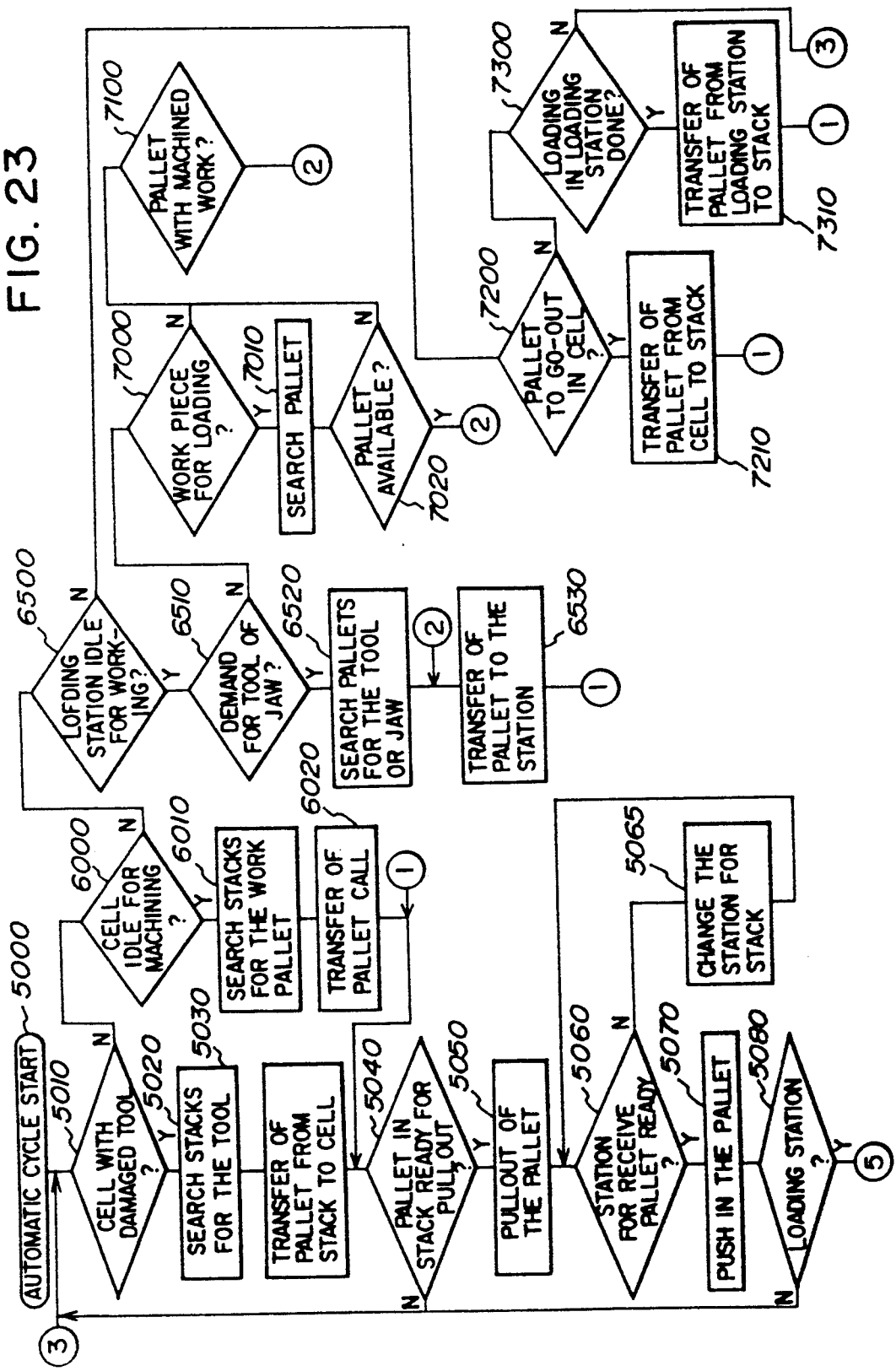

FIG. 24

| ITEM | | ITEM |
|---|---|---|
| TOOL NO. | | SUPPLEMENT OF WEARING Z |
| SUFFIX | | |
| DATA VALID FLAG | | MAXIMUM WEARING X |
| STATUS | | |
| SUPPLEMENTAL TOOL GROUP NO. | | MAXIMUM WEARING Z |
| SHAPE CODE A | | |
| SHAPE CODE B | | CUTTING ANGLE ENGRAVE DEPTH CUTTING DEPTH |
| ROTATION + MILL / ANGLE | | |
| MAXIMUM NUMBER OF WORKS DONE BY THE TOOL | | CUTTER ANGLE CUTTER WIDTH NUMBER OF BLADE |
| NUMBER OF WORKS DONE BY THE TOOL | | |
| HOLDER NO. | | LIFE TIME |
| CUTTING POINT PATTERN | | |
| SUPPLEMENTAL TOOL SUPPLEMENT NO. | | TIME USED |
| ✕ | | |
| TOOL CODE | | TOOL-EYE ADJUSTED X |
| CUTTING POINT RADIUS DIAMETER OF TOOL | | TOOL-EYE ADJUSTED Z |
| TOOL SET X | | TOOL WIDTH |
| TOOL SET Z | | TOOL LENGTH |
| SUPPLEMENT OF WEARING X | | TOOL NAME |

FIG. 25

| | ITEM |
|---|---|
| | JAW NO. |
| | JAW POSITION |
| | OUTER / INNER |
| | DIMENSION |
| | CHUCK BARRIER YES / NO |
| | CHUCKING SIZE |
| | JAW REFORMED YES / NO |
| | JAW REFORMING YES / NO |
| | JAW REFORMING PROGRAM NO. |
| | TIME USED FOR THE JAW |
| | LIFE TIME FOR THE JAW |
| | DATE OF MACHINING |
| | NUMBER OF READ-WRITE FOR MEMORY |

FLEXIBLE MANUFACTURING SYSTEM

BACKGROUND OF THE INVENTION

1. Field of the Invention

This invention relates to a flexible manufacturing system for automatically manufacturing many kinds of processed works, and which is provided with a complex machine tool.

2. Description of the Prior Art

There is known an FMS (flexible manufacturing system) which is provided with a complex machine tool and a device for transferring loading members such as works or working tools (cutting tools, chucking jaw, etc.).

The specification of U.S. Pat. No. 4,369,563 (Molins) discloses a machine tool plant which possesses plural NC (numerical control) machine tools, stores with plural storage means, a transferring device for transferring works between store and machine tool group, and a central program controlling means for controlling the movement of the works and the processing operation.

In this system of the specification of U.S. patent, works, tool magazines and three kinds of members (jig, template, work order sheet) are stored separately, and when necessary, transferred to the specified machine tool by the transfer means. The pallet (carrier) for carrying work has an identifying sign, and also has a means for feeding back to the central program control means.

The gazette of Japanese Patent Laid-Open Showa 63-102857 discloses a manufacturing system comprised of a loading station for receiving work, jig and tool, and data, a memory for memorizing data of the loading station, a transferring means for transferring memory and work, jig, tool as a unit, an automatic machine tool placed at a distance from the loading station, and a data reading device located near the machine tool for transferring data of the memory to the control unit of the machine tool.

Also the above-mentioned Japanese Patent Laid-Open Gazette discloses a cell system provided with a storage for storing working tools, works and data.

In the machine tool plant specified in the U.S. patent specification, the data is controlled by the central program control means, and the matching of the member, such as the working tool and the data, depends on the accuracy of the operation of the operator. Therefore, when the operator makes the loading error of the working tool and the like, the system cannot find that error so it becomes the cause of trouble. Also, the means for putting the supplied working tool to the machine tool has to be done manually by the operator.

Moreover, the prior art system is delicate and thus prone to failure. For example, when data is damaged by incidents such as a power failure, it takes time for the system to be restored. Therefore it is not suitable for continuous automatic manufacturing for many hours.

The manufacturing system stated in the above-mentioned Japanese Patent Laid-Open Gazette could handle the member and the data as a unit, but because the members itself does not possess the data, the match between the member and the data depend on the operation of the operator. Therefore, it is necessary for the operator to carry out loading with accuracy based on the data give, and the detection and prevention of the loading error is impossible.

The working tool itself does not posses the data. Therefore, for example, when a breakage of the tool and the like has occurred, that tool cannot be identified, so it cannot be exchanged automatically.

Therefore, it is not suitable for continuous automatic manufacturing for many hours.

SUMMARY OF THE INVENTION

The present invention provides a flexible manufacturing system which automatically manufactures many kinds of work continuously for many hours, and simplifies the preparation operation by the operator by the possessing of the data by the tool and the jig, and also by the pallet for locating the tool and jig.

The flexible manufacturing system of the present invention is composed of, as a basic means, a pallet possessing a memory element for memorizing the data of the pallet itself and the loaded member, a read-write means in communication with the memory element of the pallet, a stack yard for storing stacked pallets (group pallet) which is made by layering pallets, a loading station for loading members to the pallet, a display for providing the loading data, a machine tool for receiving the stacked pallet and automatically working based on the data memorized in the drive memory element of said pallet, and a transferring device for transferring pallet with works and working tools in between the stack yard, the loading station and the machine tool.

The pallet for storing members such as a work place and working tool has a memory element for holding the data concerning the pallet itself and the stored member. Therefore, work to be worked upon, the working tool as a necessary loading member, and the data of those members always move as a whole. That is, the device supplied from the pallet could directly receive necessary data for treatment by reading the data of the memory element of the pallet, therefore accurate and swift operation can be obtained.

BRIEF DESCRIPTION OF THE DRAWINGS

FIG. 8 is a list of data to be written to the memory element of the pallet;

FIG. 9 is a perspective view showing the whole of the machine tool;

FIGS. 23 and 23A are a flow chart for control;

FIG. 24 is a table showing the item of data concerning the tool; and

FIG. 25 is table showing the item of data concerning the chuck jaw.

DETAILED DESCRIPTION OF THE PREFERRED EMBODIMENT

The embodiment of the present invention will be described below with reference to the drawings.

Figure 1:
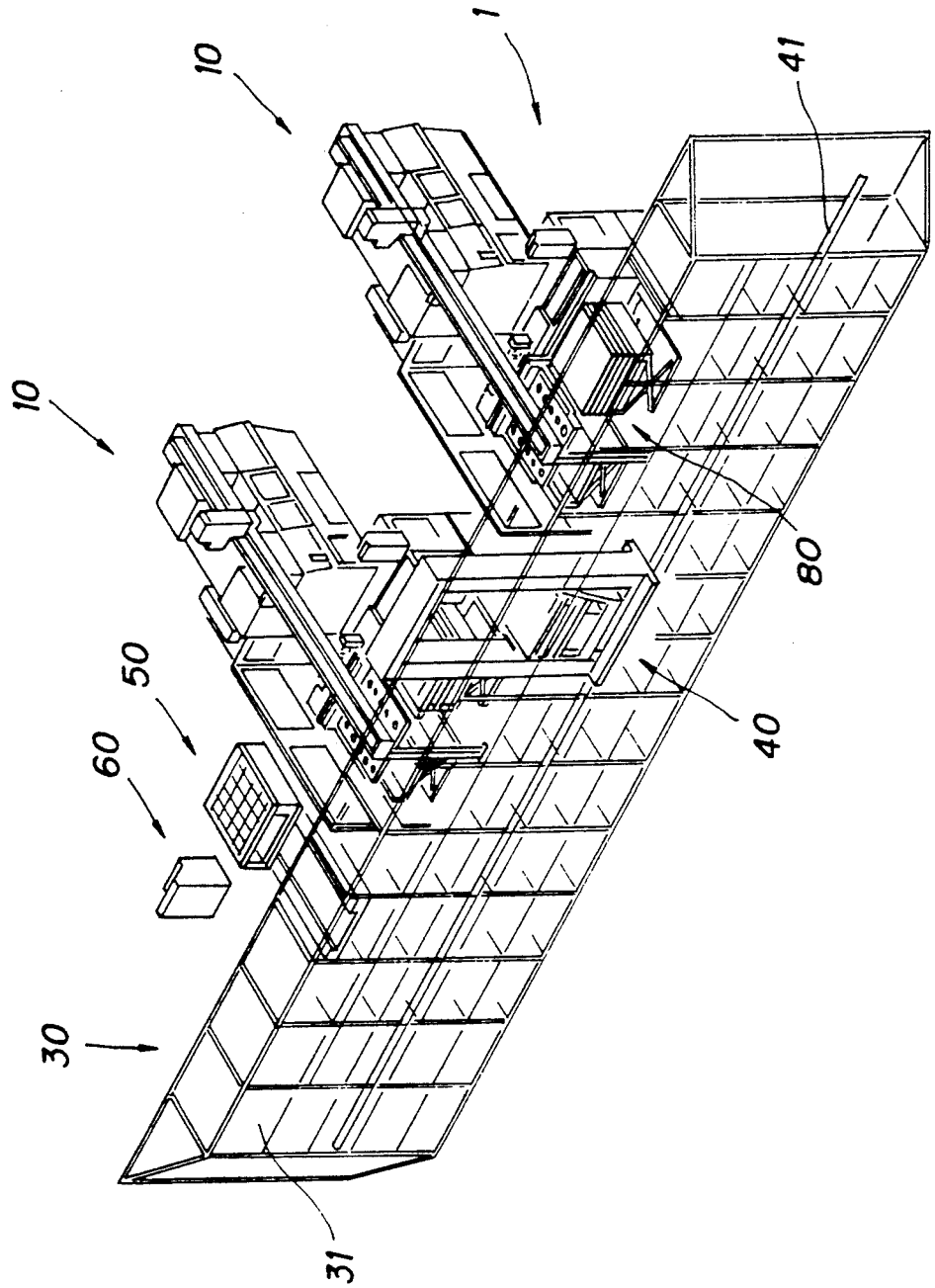
FIG. 1 is a perspective view of an embodiment of the present invention.
Figure 2:
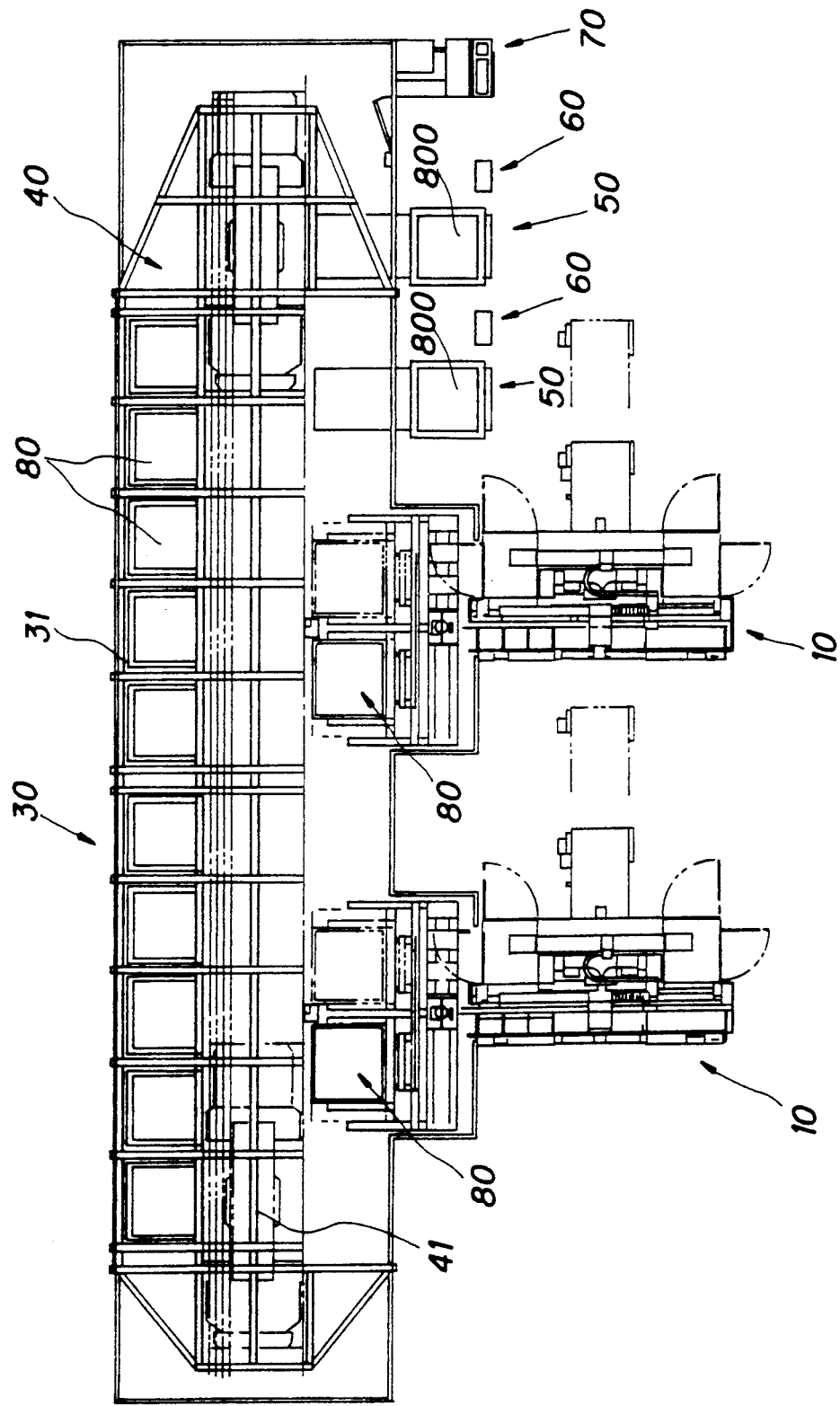
FIG. 2 is a plan view.

FIG. 1 is a perspective view showing the whole of the flexible manufacturing system of the present invention, and FIG. 2 is a plan view.

The flexible manufacturing system indicated as a whole by the number 1 is equipped with a number of automatic machine tools 10.

The automatic machine tool 10 has, as mentioned afterwards, a lathe and a member transfer device, and said transfer device achieves automatic loading by feeding the work piece, chuck jaw, working or machining, tool and the like to the lathe, and therefore has an ability of automatically working many kinds of work provided in the state of a stacked pallet. Hereinafter, this automatic machine tool 10 will be called the lathe cell.

In the present embodiment, a case where two lathe cells are used is shown. However, the number of lathe cells could be increased or decreased as required.

The lathe cell 10, equipped with two stations for the loading and unloading of the stacked pallets, carries out automatic working when provided with a stacked pallet (group pallet) with working tool and work (work-piece) loaded on it. The working tool and work are loaded on the pallet beforehand, and stored in the stack of the stack yard as a stacked pallet made by, for example, layering ten pallets as a group.

Figure 3:
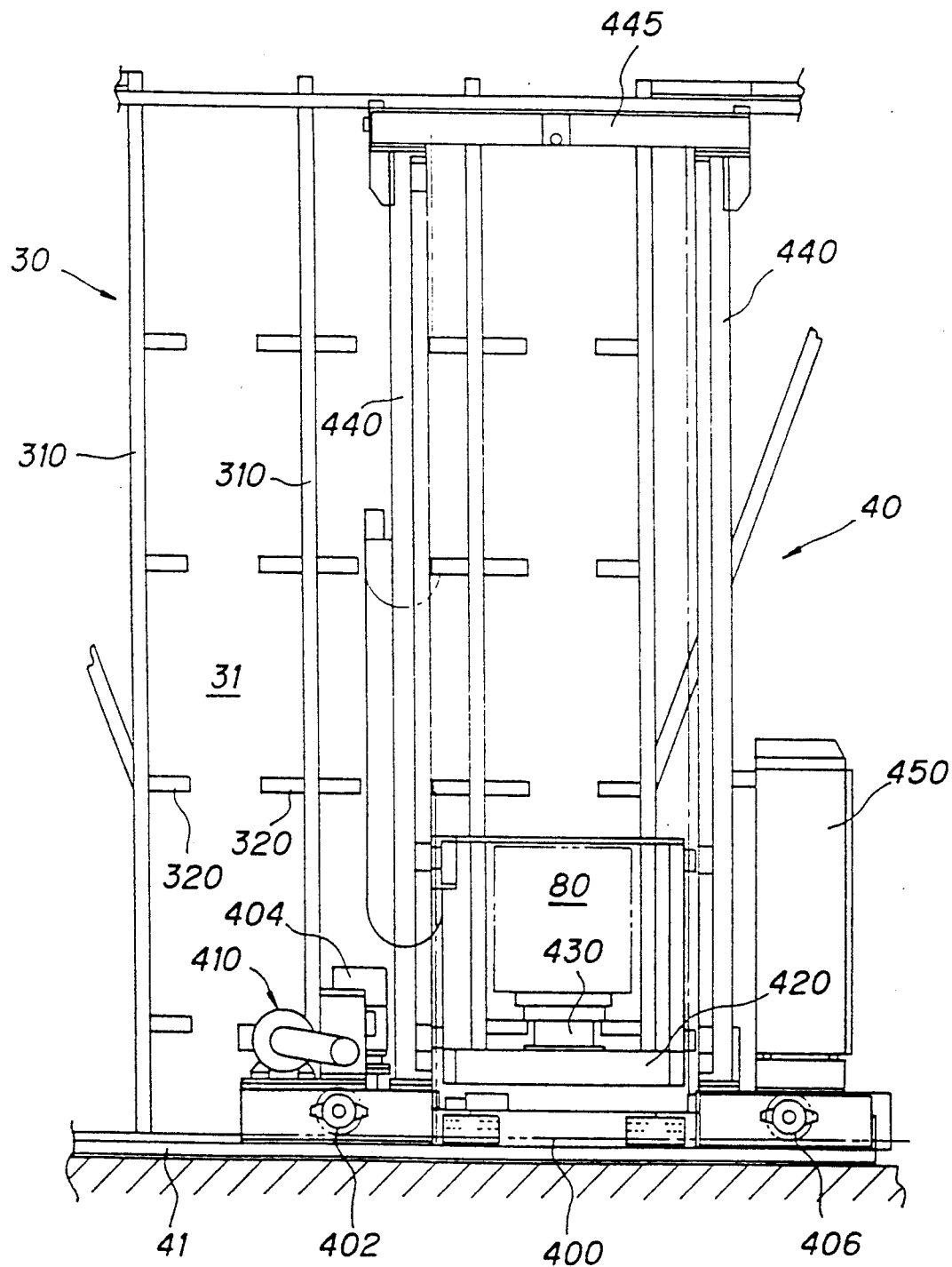
FIG. 3 is a front view of the stack yard and stacker crane.
Figure 4:
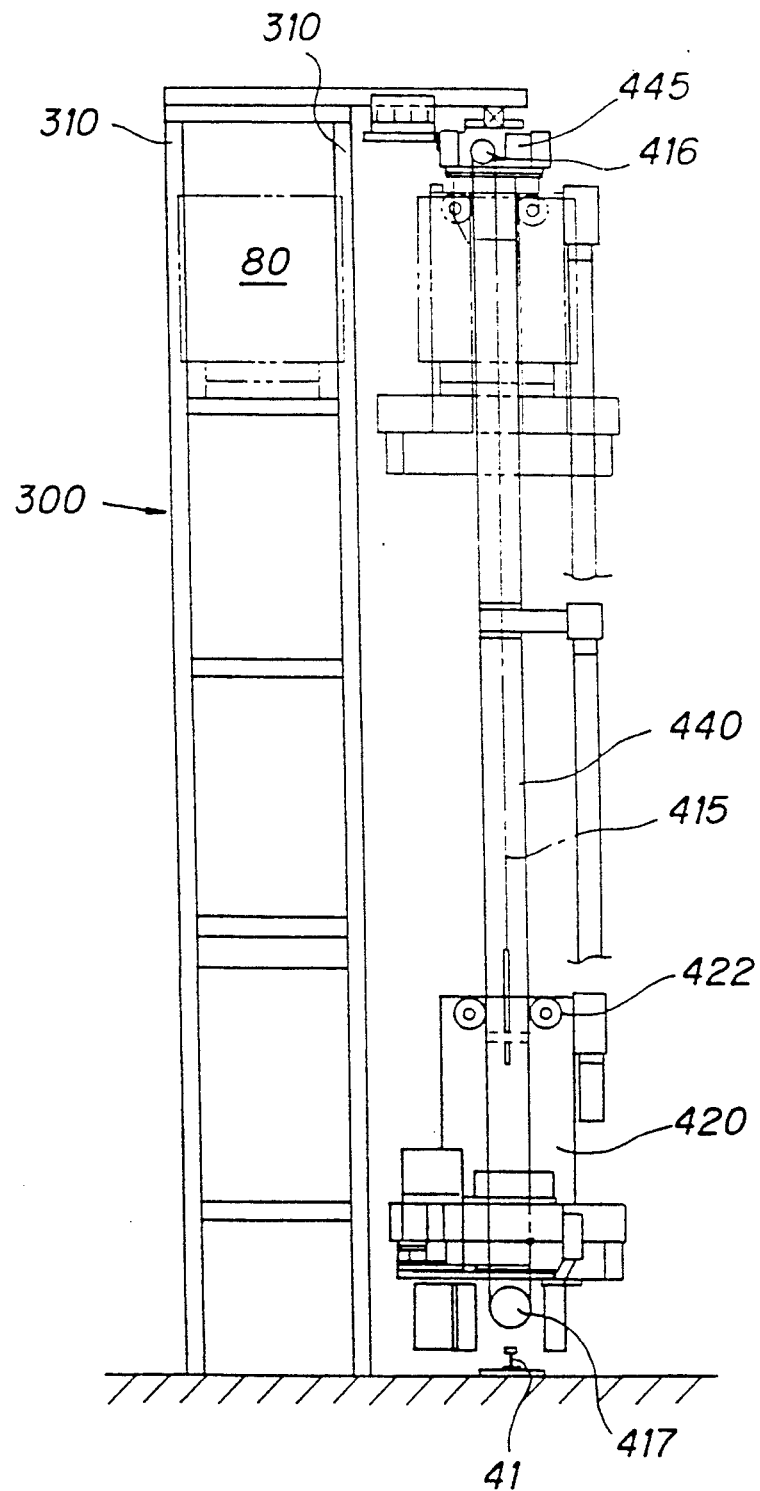
FIG. 4 is a side view.

FIGS. 3 and 4 are front and side view showing the whole structure of the stack yard 30 and the stacker crane 40.

The stack yard 30 has posts 310 set proportionally, and support members 320 installed horizontally to the post 310, and a number of stacks 31 are formed thereon.

The stacker crane 40 is supported on the rail 41 by the drive wheel 402 and the driven wheel 406, and the top of the frame 400 is provided with the drive motor 404, the elevator 410 of the carriage 420, and the control device 450.

On top of the frame 400, two columns 440 are set, and the top of the column 440 are connected by the upper frame 445. To the column 440, the carriage 420 is supported elevatably through the roller 422, and the carriage 420 is hung by the chain 415. On top of the carriage 420, a fork device 430 is installed. The fork device 430 carries out loading and unloading of the pallet group 80 to the stack 31.

The stacker crane 40 is driven by the drive motor 404 on top of the rail 41.

The chain 415 which supports the carriage 420 is provided between the drive sprocket 416 and the driven sprocket 417. By driving the sprocket 416 by the motor 410, the carriage 420 elevates. By detecting the number of rotations of the driven sprocket 417 by, for example, a rotary encoder, the carriage 420 could be positioned accurately at the desired height.

Therefore, loading an unloading of the stacked pallet to the stack 31 and the exchange of the stacked pallet can be achieved.

The loading station 50 is provided facing the rail 41 of the stacker crane 40. In the loading station 50, the operator carries out attaching and detaching of the working tool and work to the pallet.

The display 60 is provided adjacent to the loading station 50. The display 60 is equipped with, for example, a CRT display, and gives orders concerning the loading operation to the operator to facilitate the loading or setting up operation of the pallets.

The data is supplied to the display 60 from the system controller 70 which controls the whole of the flexible manufacturing system 1, but it could be supplied from the memory element attached to each pallet.

Figure 5:
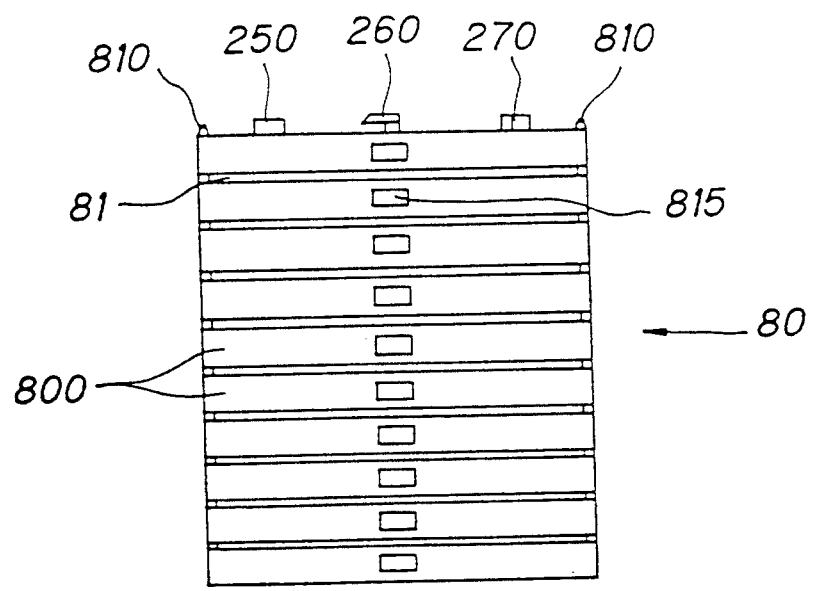
FIG. 5 is a front view of the group pallet.

FIG. 5 is a front view showing the outline of the stacked pallet.

The stacked pallet indicated as a whole by the number 80 is structured by layering, for example, ten pallets 800 with each having a rectangular frame. The pallet 800 is equipped with a member for positioning on its upper surface, and locates work, working tool and the like to the prescribed place. The pins 810 are set on each of the four corners of the pallet 800 and the pin 810 supports the pallet layered on top of it. The height of the pin 810 can be adjustable. The height of the pin 810 is changed according to the size of the work or working tool to be located on the pallet. By this pin 810, a gap 81 is formed between each layered pallet 800.

The fork of the stacker crane 40 is inserted in this gap 81, and could lift a desired layer of pallets on top of the fork. By using this function, layer exchange of the pallet can be achieved.

The pallet 800 is equipped with the memory element 815. This memory element 815 is, for example, made of an IC element.

FIG. 8 shows an example of the item of the data to be written in the memory element 815 of the pallet. In the memory element 815, data such as pallet number, height of the pin, data concerning the loaded work or working tool and the like are inputted.

A pallet 800 could be used as a specialized pallet according to the kind of the member, such as a work pallet for loading works, a tool pallet for loading tools, and a chuck jaw pallet for loading chuck jaws.

In the flexible manufacturing system of the present invention, each working tool such as a tool, chuck jaw and the like has its own memory element and possesses data concerning itself.

FIG. 24 shows the item of the data concerning the tool and FIG. 25 shows the item of the data concerning the chuck jaw.

The lathe cell 10 reads the data of the memory element of the tool, chuck jaw and the like when transferring these tool and chuck jaw to the lathe, and checks it with the data obtained from the memory element of the pallet. Therefore, even if there were loading error by the operator and the prescribed tool and chuck jaw were not loaded on the pallet, the fastening of the wrong tool and chuck jaw to the lathe could be prevented and the automatic continuous manufacturing could be maintained.

Figure 6:
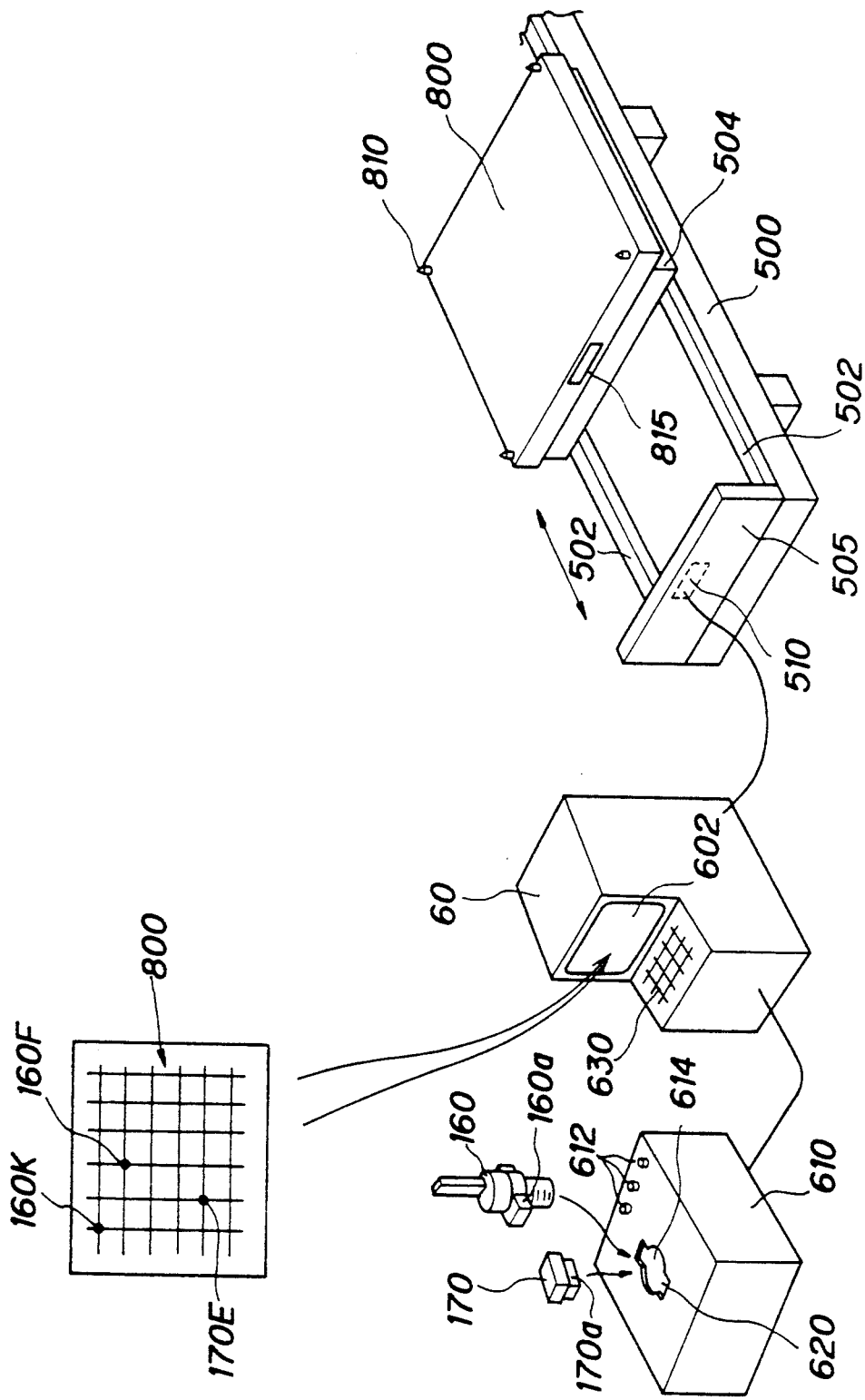
FIG. 6 is a perspective view of a loading station.

FIG. 6 shows an outline of the loading station 50 and the display 60. The upper surface of the base 500 of the loading station 50 comprises a guiding surface 502, and the table 504 loaded on top of the guide surface 502 has the function of moving the pallet 800 supplied from the stacker crane 40 in the direction of the arrow. The stopper 505 is provided on the end of the base, and the operator attaches and detaches the member on top of the pallet 800 at the place where the pallet 800 is stopped by the stopper 505.

The stopper 505 is equipped with the reading-writing device (read-writer) 510, and reads and writes the data to the memory element 815 of the pallet 800.

Therefore, by writing the data of the work or working tool and the like that should be prepared on the pallet 800 to the memory element of the pallet 800, the read-writer 510 of the loading station 50 reads this data and displays it to the display 60.

The display 60 is equipped with, for example, a CRT display 602 and a control panel 630. The display 60 is connected to the loading station 50 and displays the data of the pallet read by the read-writer 510 of the loading station.

The setting confirmation device 610 is connected to the display 60. The setting confirmation device 610 has a hole 614 for inserting the tool 160 and chuck jaw 170, and the read-writer 620 is placed inside the hole 614.

For example, in the case where the tool 160 and the chuck jaw 170 should be loaded on the pallet 800, the number of the tool and chuck jaw to be loaded and its position is shown in the display 602.

When the operator inserts the tool 160 to the hole 614 of the setting confirmation device 610, the read-writer 620 reads the data of the memory element 160a of the tool 160. Then the operator can confirm if the tool matches with the required tool or not by looking at the display 60. Also, the result of the confirmation of matching of the tool and chuck jaw could be shown using the lamp 612 and the like, thereby mismatching is alarmed on the lamp 612.

By using this setting confirmation device 610, the accurate loading is achieved easily.

After the loading operation of the pallet 800 is finished, the operator operates the operation panel of the display 60 and writes the loading data with the read-writer 510 and renews the data of the memory element 815.

The pallet with loading completed is piled on the prescribed stack of the stack yard 30 by the stacker crane 40. In the emptied loading station 50, next pallet 800 is supplied and the necessary loading is given.

When one set of stacked pallet 80 composed of, for example, ten pallets 800 is formed by continuing the above-mentioned operation, this stacked pallet 80 is stacked in the prescribed stack of the stack yard 30 by the stacker crane 40 and waits there until transferred to the lathe cell 10.

In the embodiment of the drawings, two loading stations 50 are used. However, this number could be increased or decreased as required.

Also, the loading station could be constructed so that is possesses the function of stacking the pallets.

Figure 7:
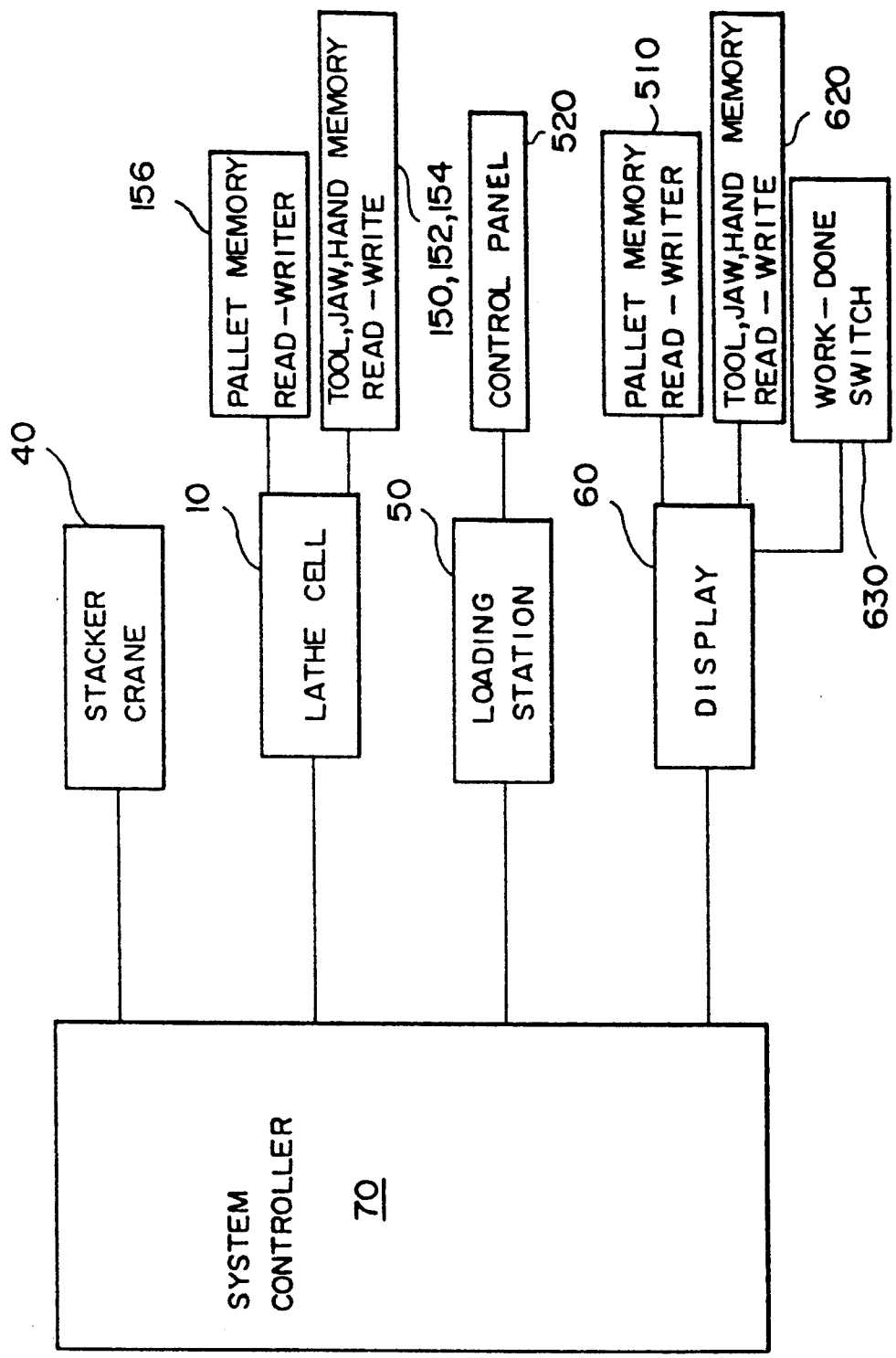
FIG. 7 is a schematic view of the present flexible manufacturing system.

FIG. 7 is a block diagram showing the structure of the flexible manufacturing system.

The system controller 70 is connected by the circuit to the stacker crane 40, lathe cell 10, loading station 50 and display 60.

The system controller 70 sends the order to the stacker crane 40 and receives the condition report from the stacker crane 40.

To the lathe cell 10, the system controller sends the transferring program or working program inside the lathe cell 10 and receives the condition report. The lathe cell 10 is, as mentioned afterwards, equipped with the read-writer 156 of the pallet memory element, and read-writers 150, 152, 154 of the memory element of the tool, chuck jaw and hand, respectively, and carries out the reading and writing of the data of each member.

To the loading station 50, the system controller sends the order and receives the condition report. The loading station 50 equipped with the operation panel 520 sends the order to the operation panel 520 and receives the condition report.

The display 60, the system controller sends the operation instruction and receives the condition report. The display 60 is connected to the pallet memory element read-writer 510 provided on the loading station 50, and also connected to the tool, chuck jaw memory element read-writer 620 of the setting confirmation device 610.

To the stocker device equipped to the lathe cell 10, a detachable hand installed to the arm of the transfer robot of the lathe cell 10 is prepared. These hands are prepared to the stocker device by the operator. Therefore, the data of the memory element of each member are reported to the system controller 70 through the display 60. The work-done switch 630 reports the end of the loading operation to the system controller 70 through display 60 by the operation of the operator.

Next, the lathe cell 10 used in the present system is described below using FIGS. 9 and on.

Figure 10:
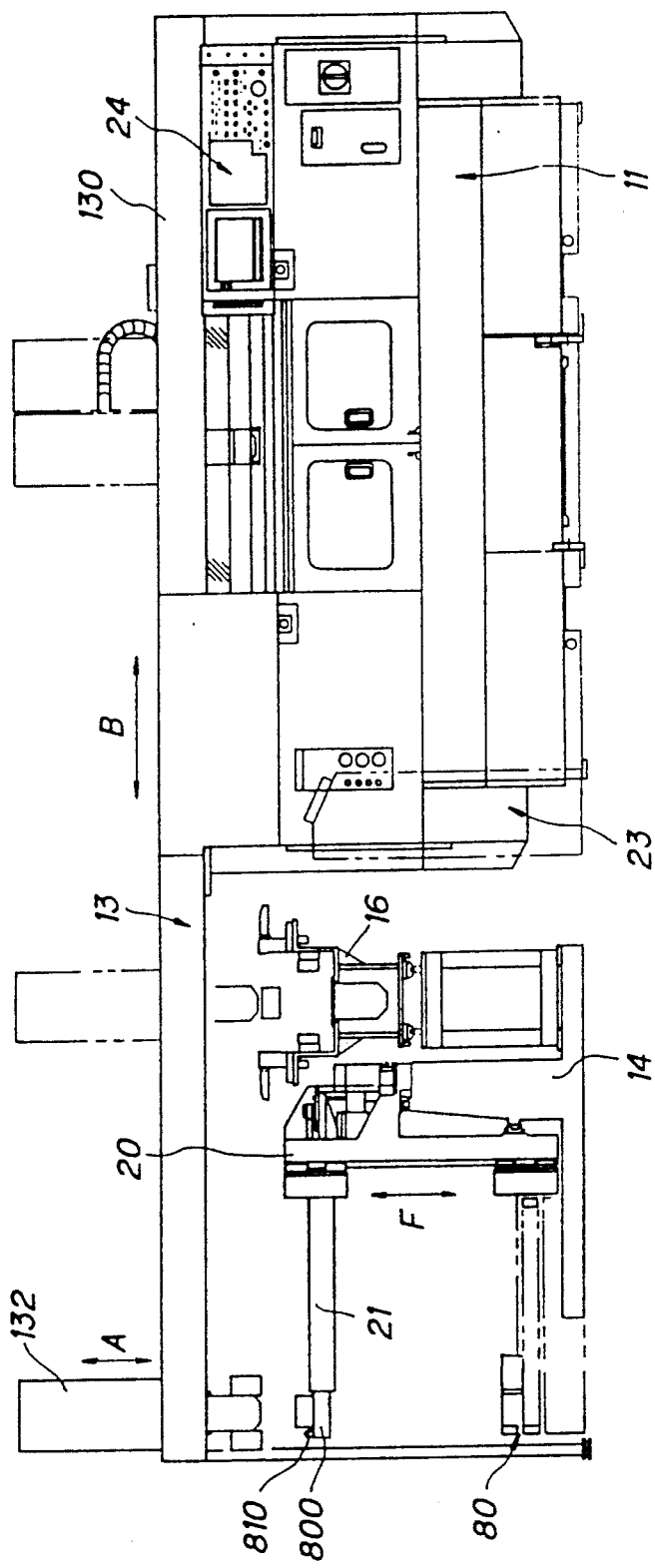
FIG. 10 is a front view.
Figure 11:
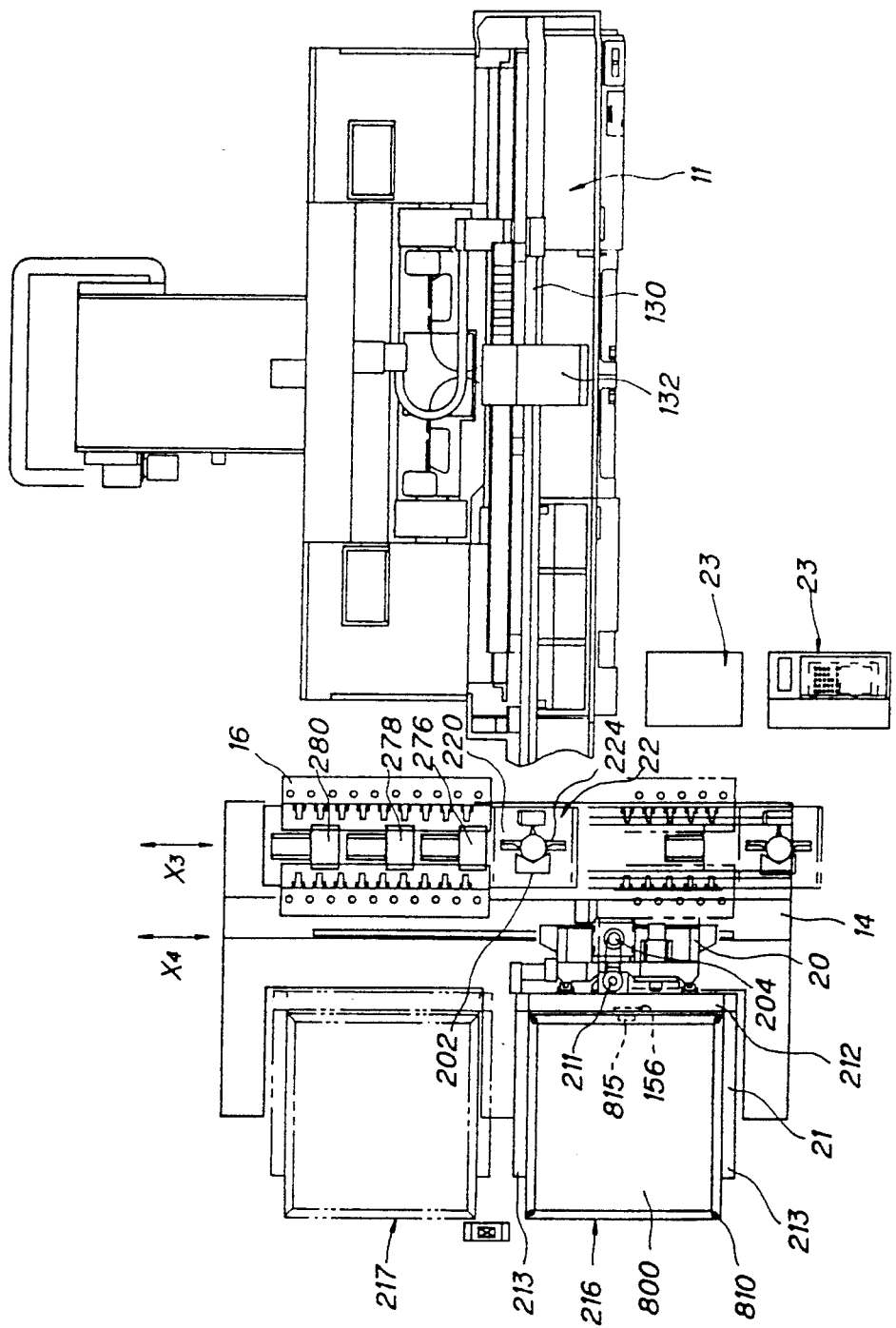
FIG. 11 is a plan view.
Figure 12:
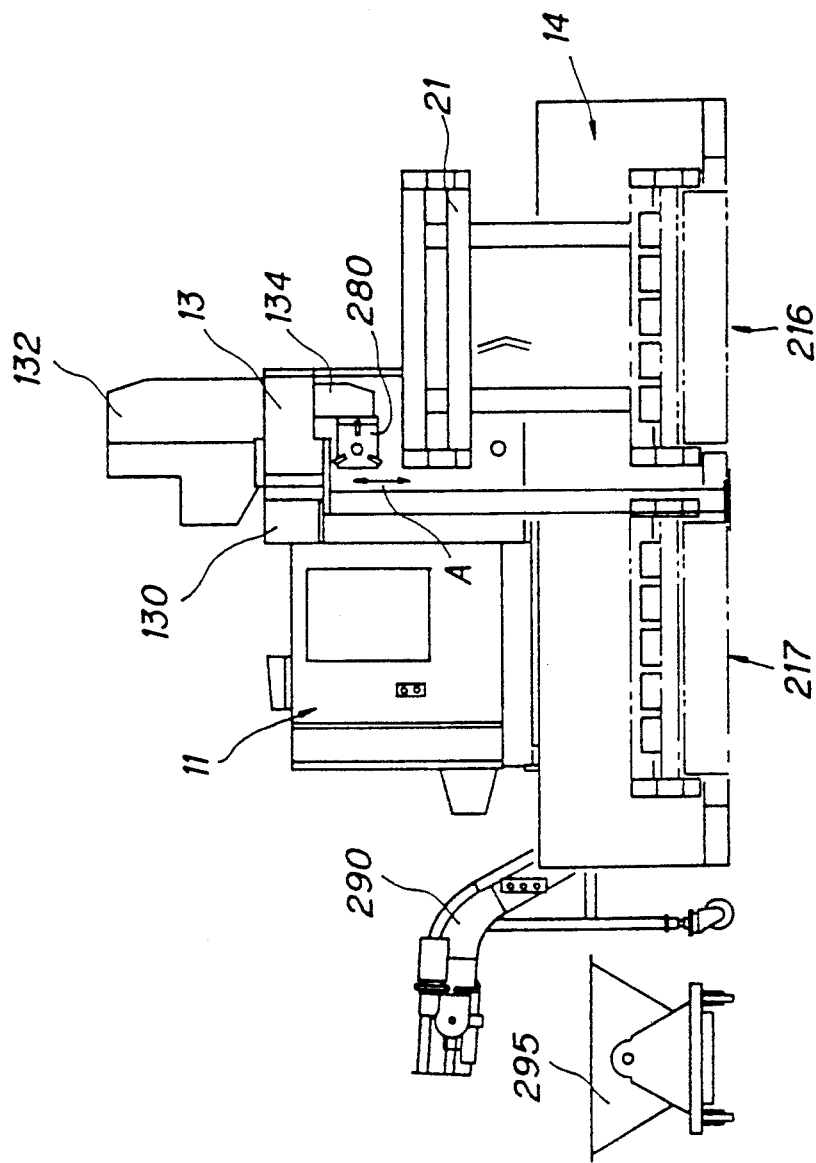
FIG. 12 is a left side view.

FIG. 9 is a perspective view showing the whole of the lathe cell 10, FIG. 10 is a front view, FIG. 11 is a plan view, and FIG. 12 is a left side view.

The lathe cell represented by the number 10 as a whole is equipped with a lathe having two spindles and two tool heads.

Figure 13:
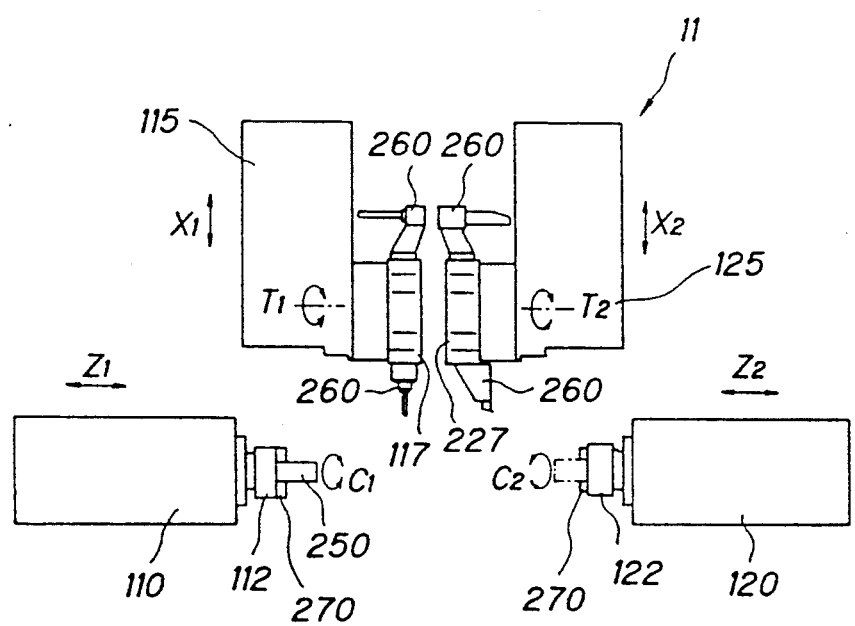
FIG. 13 is an explanatory view showing the outline of the lathe.

FIG. 13 shows an outline of the lathe 11 which has a first spindle 110 and a second spindle 120 provided opposed to each other. The first spindle 110 and the second spindle 120 has the same ability and moves in the direction shown by the axis $Z_1$ and $Z_2$, respectively.

On the other hand, two tool heads 115, 125 having the same ability are provided opposed to each other. The first tool head 115 moves in the direction of the axis $X_1$. Also the first tool head 115 possesses a turret 117 which rotates around the axis $T_1$ and to which a number of tools 260 are fitted or received. The second tool head also moves in the direction of the axis $X_2$, possesses a turret 227 which rotates around the axis $T_2$ and to which a number of tools 260 are fitted or received.

The first spindle 110 possesses a chuck 112. By chucking the work 250 with the chuck jaw 270, necessary machining is done to the work 250 using the tool 260 of the first tool head 115. The feed distance of the tool $Z_1$, the number of rotation around the axis $C_1$ of the first spindle 11, the feed distance of the axis $X_1$ and the index around the axis $T_1$ of the tool head 115 are controlled by the NC device.

The lathe cell 11 is equipped with a means of detecting the tool cutting point of the tool 260 (not shown), and by measuring the tool cutting point and feeding the result back to the NC device, the size of the work is measured indirectly and the cutting accuracy can be maintained. Also, it can be equipped with a device for measurement on the machine (not shown) which contacts with the work to measure the size of the work directly.

When the machining of the first process is finished by the first spindle 110, the chuck 112 of the second spindle 120 receives the work 250 from the first spindle 110, and completes the work 250 by running the machining of the second process together with the second tool head 125 controlled by the NC device.

The lathe 11 has, as mentioned above, two spindles and two tool heads, and has the ability of machining work with complicated shapes automatically.

The chip conveyor 290 is provided on the rear side of the lathe 11 to gather chips produced by the cutting, and collects the ships in the chip bucket 295.

The transfer device indicated by the number 13 as a whole is equipped with a guide rail 130 provided on the upper area of the lathe 11. The guide rail 130 is provided along the axis B which is in parallel with the axis $Z_1$. $Z_2$ which is the moving direction of the spindle of the lathe. A transfer robot 132 is installed movably on top of the guide rail 130.

The transfer robot 132 is equipped with an arm 134 which moves along the axis A which is set vertically. A work hand 280 is installed at the tip of the arm 134. However, in the way mentioned afterwards, this work hand 280 is installed exchangeably in order to transfer many kinds of works.

Adjacent to the lathe 11, a stocker device 14 for stocking the member under the guide rail 130 and supplying that member to the lathe 11 when necessary is provided.

Figure 14:
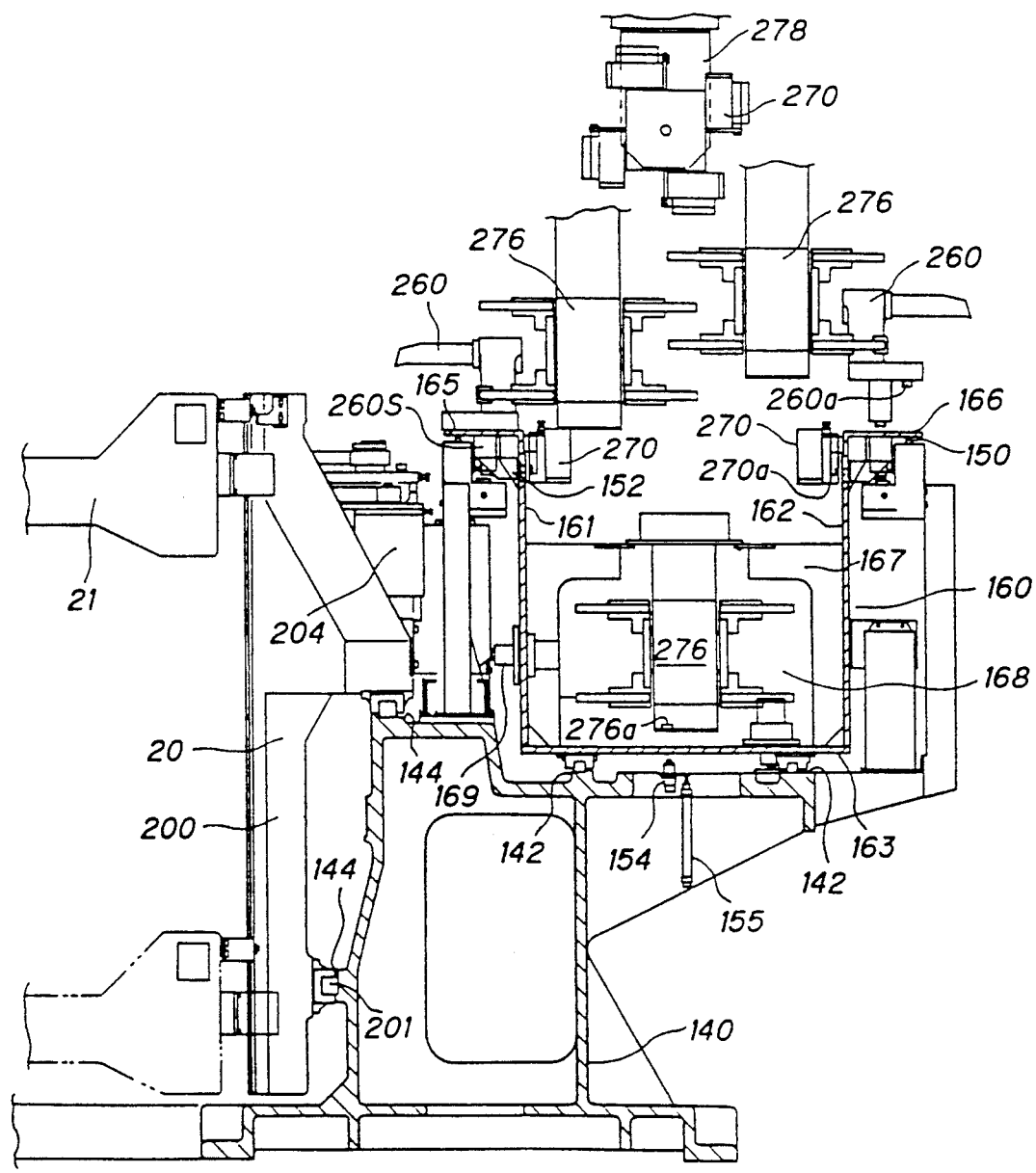
FIG. 14 is a cross-sectional view of the main part of the stocker device.
Figure 15:
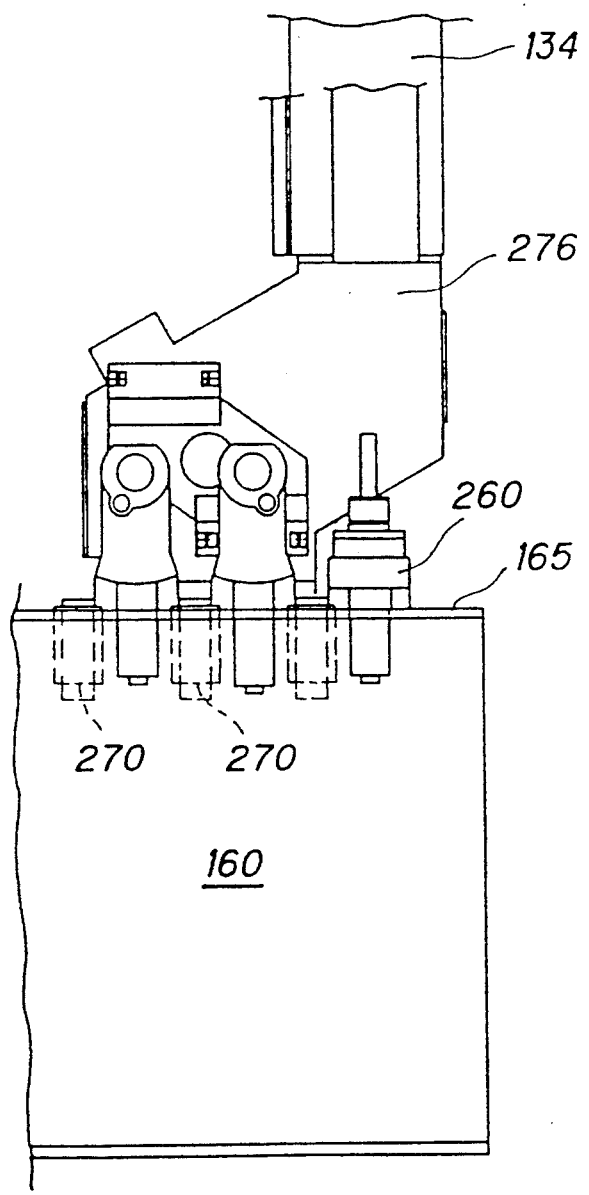
FIG. 15 is a side view of the main part of the stocker device.

FIG. 14 is a cross-sectional view of the main part of the stocker device 14 and FIG. 15 is a side view of the main part.

The stocker device 14 has a base 140 to be located on the floor surface, and the base 140 is equipped with two pairs of a guide surface (each pair consists of two guide surfaces). The first guide surface 142 is provided along the axis $X_3$ which crosses transversely with the axis B of the guide rail 130. The second guide surface 144 is provided along the axis $X_2$ which is parallel to the axis $X_3$.

On top of the guide surface 142, a stocker indicated by the number 16 as a whole is located movably along the axis $X_3$.

The stocker 16 consists of the first side wall 161, the second side wall 162 and the floor 163 which connects the two side walls. Also, it is equipped with the stocker body 160 which opens at the top and has a box-like shape with its section almost square. A roller which rolls on top of the guide surface is equipped on the lower surface of the floor 163.

The upper-end portion of the first side wall 161 extends horizontally outwardly to form the first flange 165. The upper-end portion of the second side wall 162 also extends horizontally outwardly to form the second flange 166.

The stocker body has a slender shape which extends along the axis $X_3$ with the inside of which separated to a number of rooms 168 with plates 167.

In the room 168, various hands to be installed exchangeably to the tip of the arm 134 of the transfer robot 132 are stored. In the present embodiment, three kinds of hands, that is, a tool hand 276 for handling the tool supplied to the lathe 11, a jaw hand 278 for handling the chuck jaw to be supplied to the chuck 112, 122 of the spindle 110, 120, respectively, and a work hand 280 for handling the work are prepared.

The first flange 165 and the second flange 166 both have holes formed periodically along the axis $X_3$ to form the first and second tool stocker. In each hole of the stocker, tools 260 are inserted. In the present embodiment, a case where twenty tools 260 (ten in each stocker) are stored in the stockers are shown. However, this stored number could be changed as required.

At the inner side of the upper part of the first side wall 161 and the second side wall 162, holding members of the chuck jaw are provided periodically along the axis $X_3$ to form the first and second chuck jaw stocker. The chuck jaws 270 are inserted in each stocker. In the present embodiment, a case where eighteen of chuck jaws 270 are stored is shown. However, this number of chuck jaws 270 could be changed as required.

The stocker body 160 is indexed along the axis $X_3$ and is equipped with means for positioning (for example, positioning by servo motor).

Each tool, chuck jaw, and hand is equipped with a memory element including IC and records necessary data.

The tool 260 is equipped with a memory element 260a. At the side of the stocker device facing the base 140 a read-write head (read-writer) 150 is provided in order to read the data of the memory element 260a of the tool or to write the data to it. The chuck jaw 270 consists of a base chuck jaw and a soft chuck jaw to be installed to the base chuck jaw. A memory element like the ones mentioned above is equipped on the rear side of the base chuck jaw. And at the base 140 side a read-write head 152 opposing the memory element 270a of the chuck jaw 270 is provided. This read-write head 152 has the structure that it revolves to come near the memory element 270a of the chuck jaw 270 only when it reads or writes the data in order to avoid interference of the tool shank 260S when the stacker body 160 transfers.

The tool 260 stored in the first flange 165 and the chuck jaw 270 stored in the first side wall 161 are fed as a rule to the first tool head 115 and the first spindle 110. The tool 260 stored in the second flange 166 and the chuck jaw 270 stored in the second side wall 162 are fed to the second tool head 125 and the second spindle 120.

FIG. 14 shows the state where the tool hand 276 chucks the tool 260 of the first flange 165 and the tool 260 in the second flange 166. Also, said FIG. 14 shows the state where the chuck jaw hand 278 chucks the chuck jaw 270 in the upper central part.

The hands are stored inside the stocker body 160. At the base 140 at the lower side of the floor 163 of the stocker body 160, a read-write head 154 for the hand is provided elevatably movably by the actuator 155. FIG. 14 shows the condition where the tool hand 276 is stored inside the stocker body 160. A memory element 276a is installed at the tip of the tool hand 276 to record the necessary data. The similar memory elements are equipped to the chuck jaw hand 278 and the work hand 280.

The stocker body 160 could be made so that it could stock works as well as working tools.

To the second guide surface 144 of the base 140 of the stocker device 14, a moving truck indicated by the number 20 as a whole is installed. The moving truck 20 has a frame 200 which is supported on the guide surface 144 through roller 201 and is moved along the axis $X_4$ by the driving device not shown. This moving truck 20 constructs the pallet changer together with the fork 21 and handles the pallet loaded with work in the state mentioned afterwards.

A clutch means with the detachable connecting pin 169 is formed on the stocker 16 to connect the moving truck 20 and the stocker 16 when necessary. The stocker 16 is indexed at the prescribed place along the axis $X_3$ by the driving force of the moving truck 20 and supplies hand, tool and chuck jaw or work to the transfer robot 132.

The present automatic machine tool, as mentioned above, makes the hand to be installed to the arm of the transfer robot exchangeable. Therefore, it could accomplish production of various works automatically by supplying tool and chuck jaw needed to the lathe 11.

Next, to one end of the stocker 16, a work measurement device 22 is connected. This work measurement device 22 has a block 222 for positioning work, a micrometer 224 and the like provided on top of the plate 220. The work measurement device 22 automatically measures the size of the machined work and sends that data to the control device 23.

The moving truck 20 guided by the base 140 is equipped with a fork device 21. The fork device 21 is supported elevatably movably to the moving truck 20. The motor 204 provided on the moving truck 20 rotates the driving screw 211 of the fork device 21 through transmission means, and moves the whole of the fork device 21 up and down.

The fork device 21 has a beam 212 and two parallel arms 213 projecting outwardly from the both edges of the beam 212. The pallet 800 is chucked by the inner portion of the two arms 213.

The central inner part of the beam 212 of the fork device 21 is equipped with the read-write head 156 and the position on the pallet 800 opposed to the read-write head 156 is equipped with the memory element 815.

The stocker device 14 is equipped with a loading station 216 for loading the stacked pallet 80 and an unloading station 217 for unloading the stacked pallet 80. The pallet changer consisting of the moving truck 20 and the fork device 21 transfers the pallet 800 between those two stations.

The stacker crane 40 loads the stacked pallet 80 from the stack yard to the loading station 216 or pallet accommodating means of the numerical control machine tool, and unloads the stacked pallet 80 stacked in the unloading station 217 with all of the pallet 800 machined, and stores it in the stack yard 30.

Next, an outline of the control device of the present lathe cell 10 will be explained.

Figure 16:
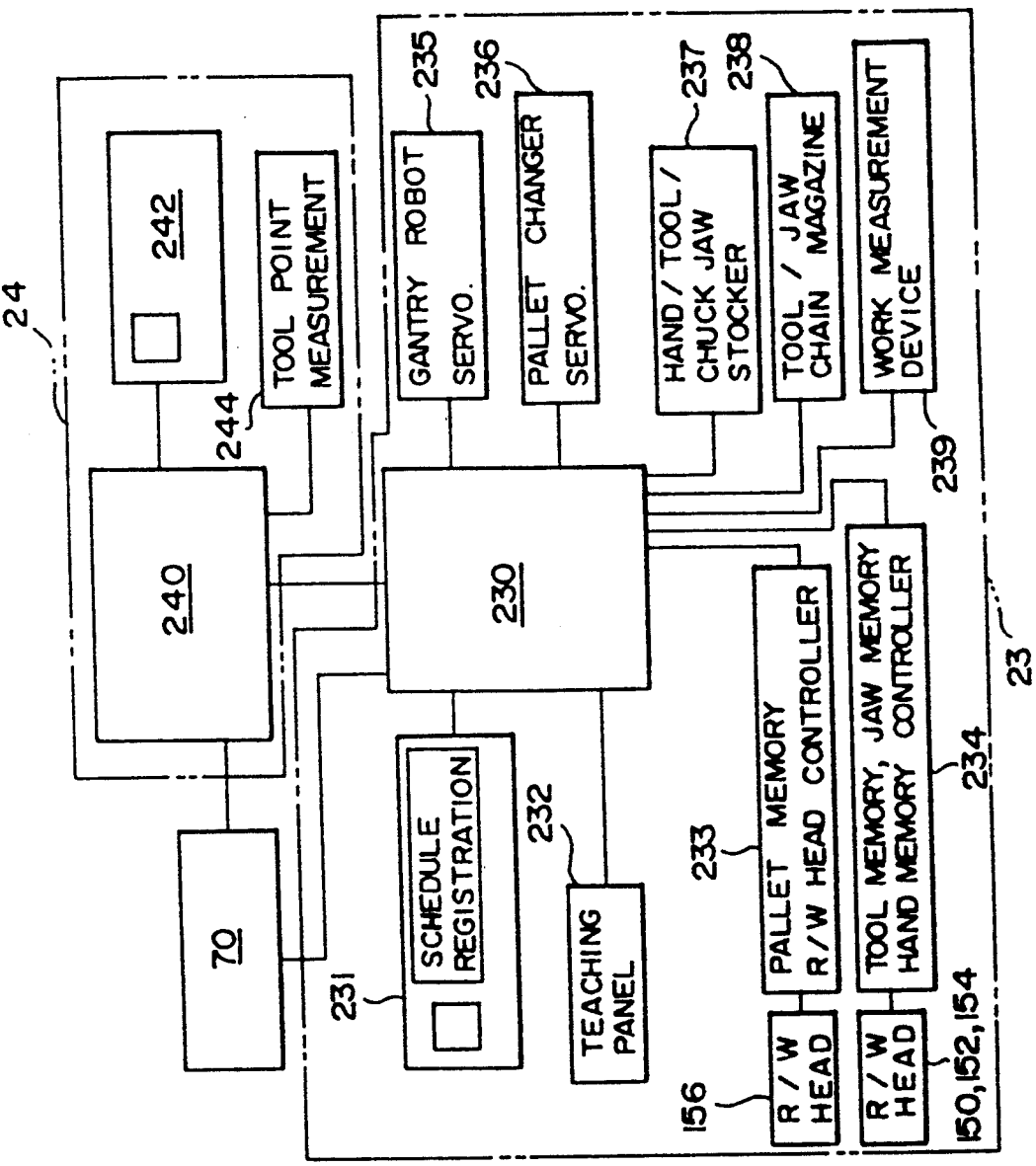
FIG. 16 is a block diagram showing the outline of the control device.

FIG. 16 is a block diagram showing the outline of the control device. The lathe cell 10 is equipped with a cell controller 23 and a NC controller 24 for controlling the lathe cell.

The cell controller 23 and the NC controller 24 are connected to the system control device 70.

The NC controller 24 having a central processing unit 240 and a control panel 242 inputs and outputs the necessary data for machining. The lathe 11 is equipped with a tool cutting point detecting device 244 for detecting the tool cutting point of the tool 260 fixed to the two tool heads 110 and 120, and by detecting the tool cutting point, it controls the size of the machined work. The data of this tool cutting point detecting device 244 is sent to the central processing unit 240 and, when necessary, the NC data is altered according to that data.

The cell controller 23 is in charge of the control of the devices in the lathe 11 other than the NC control device. In the present embodiment, a case where the NC controller 24 and the cell controller 23 in charge of the devices other than the NC control device in the lathe are formed separately is shown. However, these two control devices could be combined into one control device.

The control device 23 is equipped with a central processing unit 230, and by the control panel 231 and teaching panel 232 connected to the central processing unit the data concerning the movement of the devices to be controlled is inputted to it.

The transfer device 13 has two axes, that is, a servo axis B for operating the transfer robot 132 which moves on top of the guide rail 130 and a servo axis A for operating the up-and-down movement of the arm 234. These servos 235 are controlled by the command from the central processing unit 230. The pallet changer consisting of the moving truck 20 and the fork device 21 is equipped with a servo 236 for operating the movement of the moving truck 20 and the up-and-down movement of the fork device 21 which is controlled by the command from the central processing unit 230.

The position and the like of the stocker 16 for storing the hand, chuck jaw or tool is controlled through the unit 237.

The present automatic machine tool could enlarge the capacity of tool or chuck jaw by adding a chain type large scale magazine and the like (not shown) to the stocker 16. When the chain magazine is added, it is controlled through the unit 239.

The measuring device 22 connected in a body with the stocker 16 measures the size of the machined work. The operation of the measuring device 22 and the data such as the result of the measurement and the like is controlled through the unit 239.

The reading and writing of the data to the memory element of each of the pallets 800 is done by the read-write head controller 233 and the read-write head 156 connected to it.

Accordingly, the reading and writing of the data to the memory element of each of the tools, jaws and hands are done by the read-write head controller 234 and the read-write head 150, 152 and 154, respectively, connected to it.

This flexible manufacturing system equipped with the devices described above has a stacked pallet 80 with work 250, tool 260 and chuck jaw 270 loaded, and because each of the pallet 800, tool 260 and chuck jaw 270 has its own memory element for possessing their own data, various tables are made for controlling the system based on that data.

FIGS. 17 through 21 shows the content of each of the table.

Figure 17:
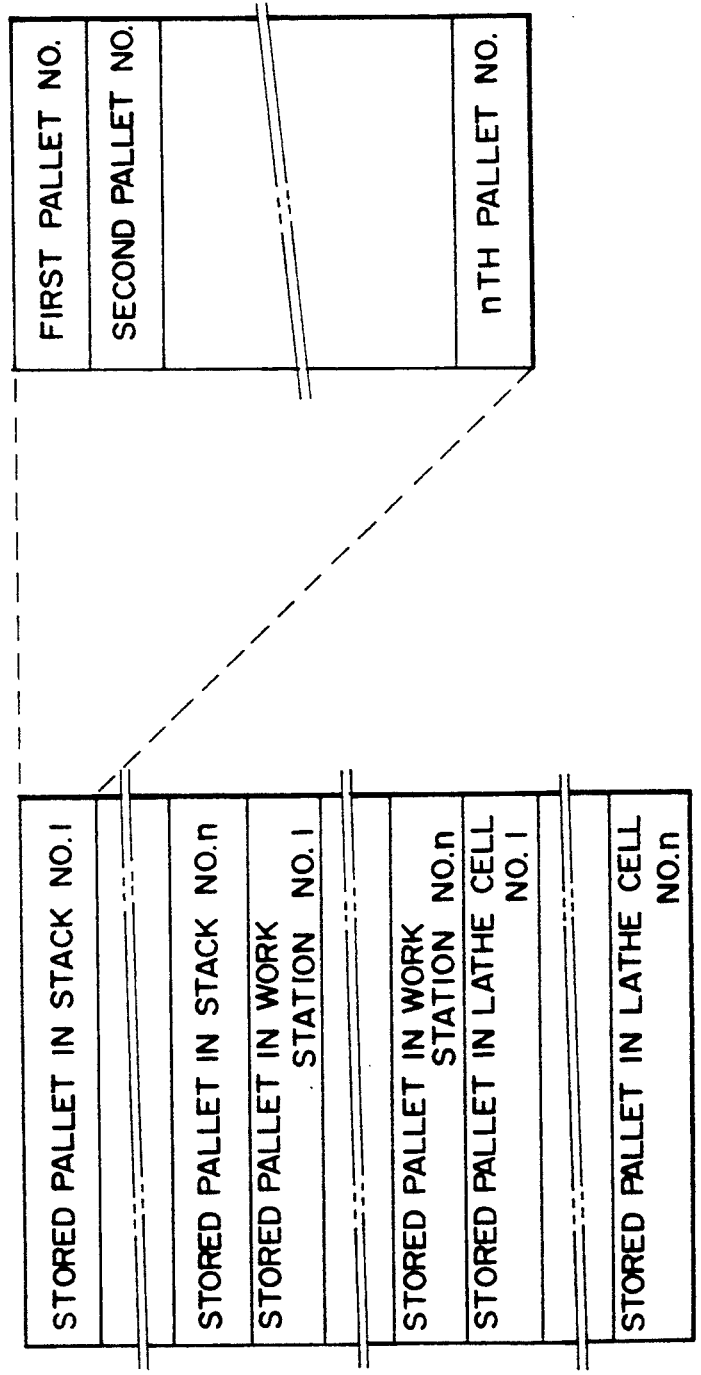
FIG. 17 is a table for controlling the position of the pallet group.

FIG. 17 is the table for controlling the position of the stacked pallet 80 in each of the stack 31 in the stack yard, loading station 50 and the lathe cell 10, and the pallet 800 consisting each of the stacked pallet 80.

The system controller 70 controls the position of the stacked pallet 80 stored in each stack 31 of the stack yard 30, and which number of pallet is stored in which stage of the stacked pallet 80.

Accordingly, it controls the number of the pallet 800 being transferred to the loading station 50 and the pallet being transferred by the stacker crane 40.

The pallet 800 inside the lathe cell 10 is controlled by the cell controller 23 inside the lathe cell 10, and its data is reported to the system controller 70.

By referring to this table, the position of the pallet with a specified number can be found.

Figure 18:
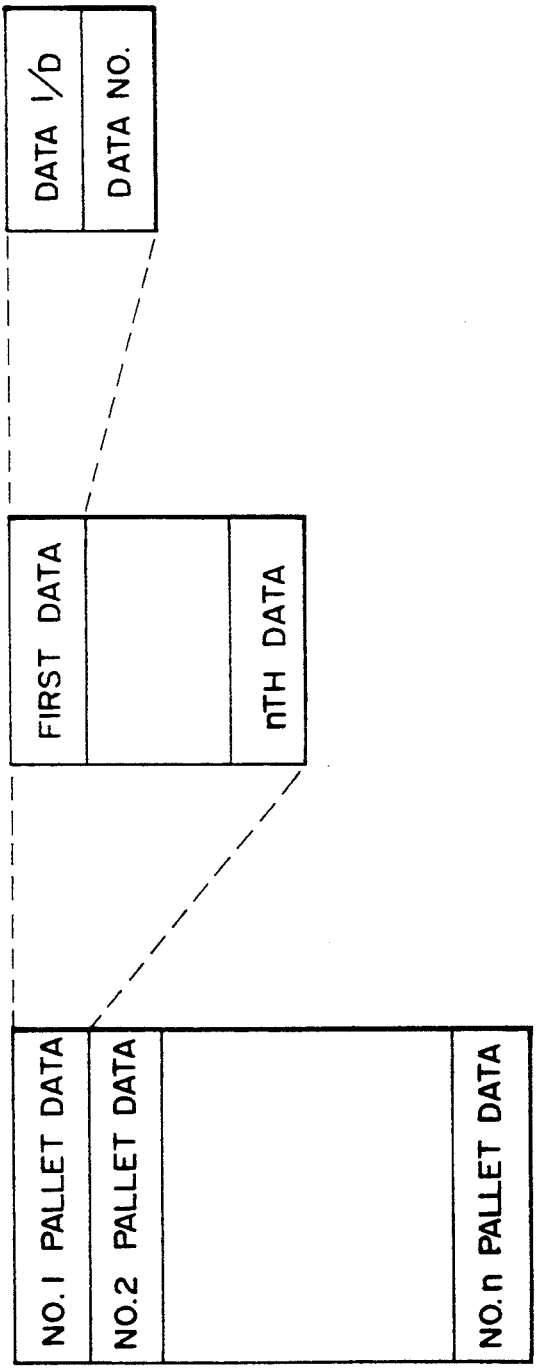
FIG. 18 is a table showing the status of the pallet.

FIG. 18 is the table showing the condition of each of the pallets.

The pallet 800 in each stage of the stacked pallet 80 stored work 250 as a member, tool 260 and chuck jaw 270 exclusively or in a mixed state.

The data of the kind of each member, loaded position data concerning the member and the like are written in the memory element 815 of the pallet 800 and also controlled by the system controller 70.

Figure 19:
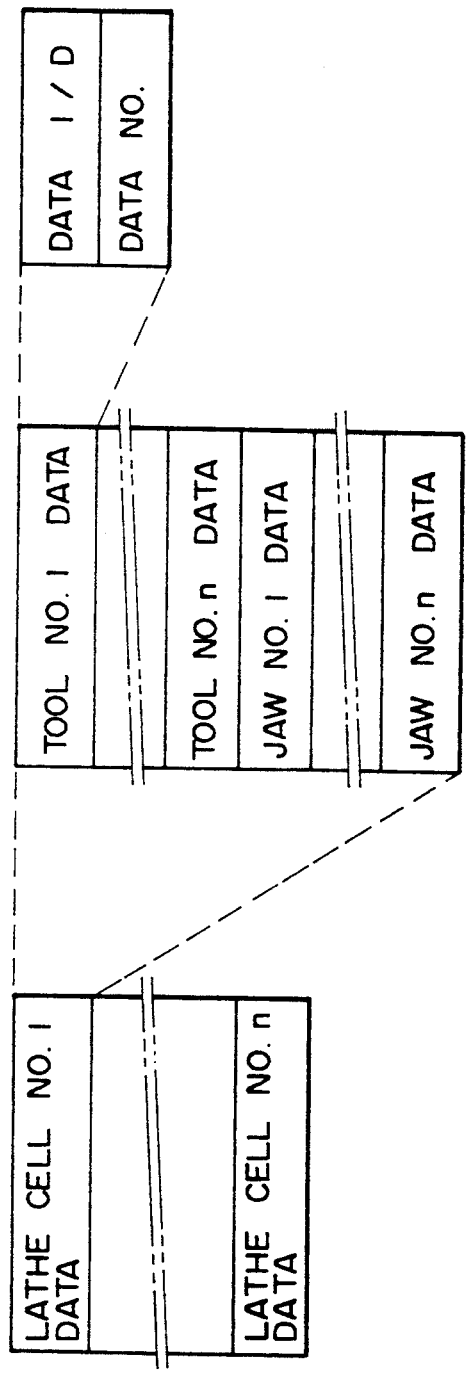
FIG. 19 is a control table in the lathe cell.

FIG. 19 is the control table of tool and chuck jaw inside the lathe cell 10.

Of the work, tool and chuck jaw stored in the stacked pallet 80 transferred to the lathe cell, tool and chuck jaw are sent to the tool stocker and chuck jaw stocker, respectively, which once function as a buffer. Afterwards, the tool is supplied to the tool head and chuck jaw to the chuck of the spindle. These tool and chuck jaw are controlled by the cell controller 23 by reading the data of each memory element with read-writer.

If the shocker is constructed to hold work together with them, work is also stocked temporarily in the stocker and then sent to the lathe.

Figure 20:
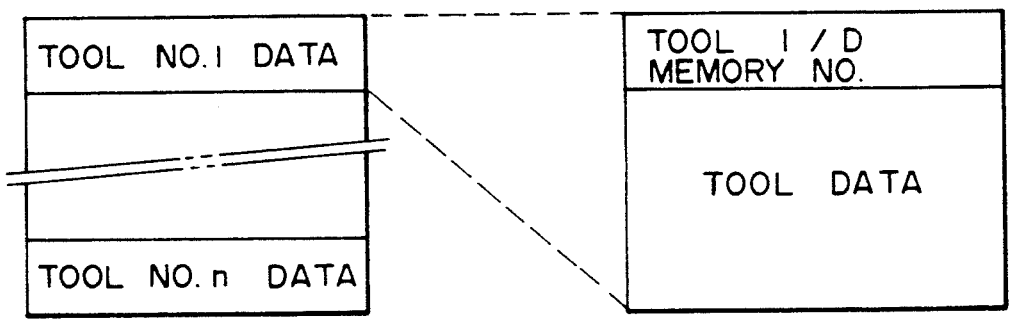
FIG. 20 is a tool control table.

FIG. 20 is the tool control table, and the data concerning all of the tools in the system are gathered to it.

Figure 21:
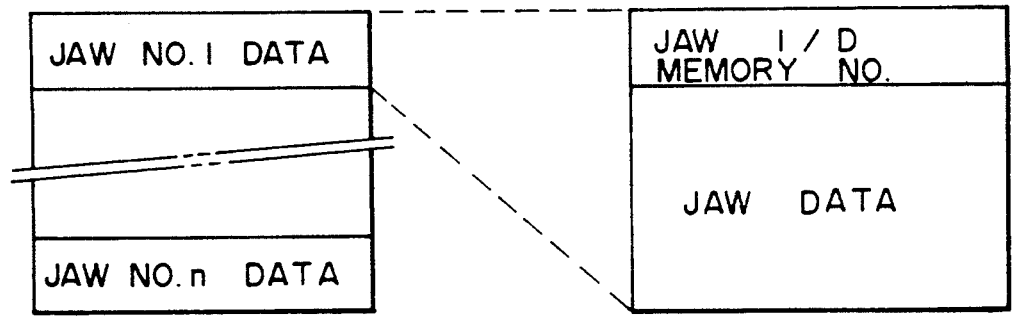
FIG. 21 is a chuck jaw control table.

FIG. 21 is the chuck jaw control table, and the data concerning all of the chuck jaws in the system is gathered to it.

Figure 22:
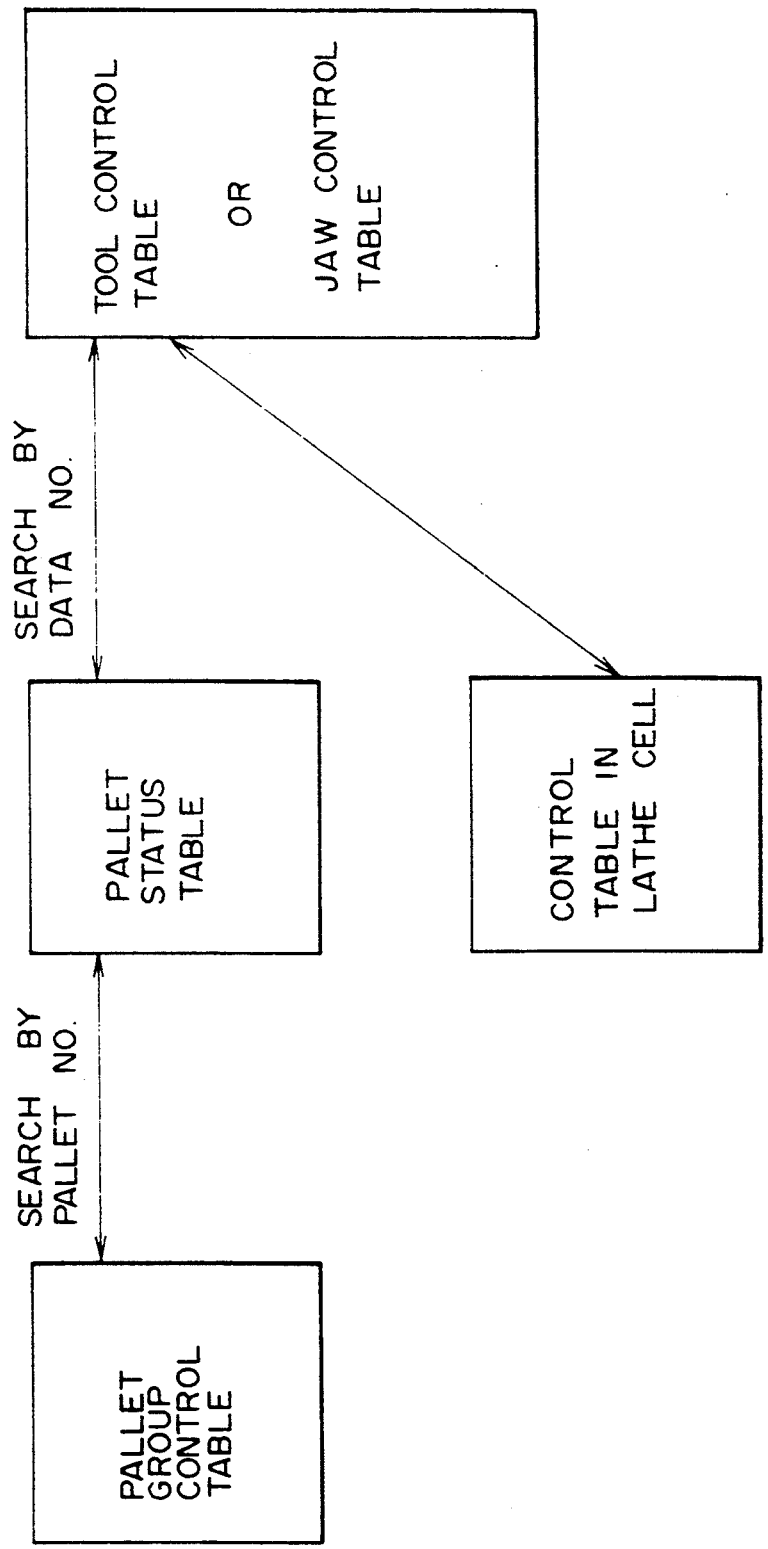
FIG. 22 is an explanatory view showing the relation of each table.

FIG. 22 shows the organic relation between each of the above-mentioned tables. The specified tool and chuck jaw could be found by the pallet number and the data number.

Figure 23A:
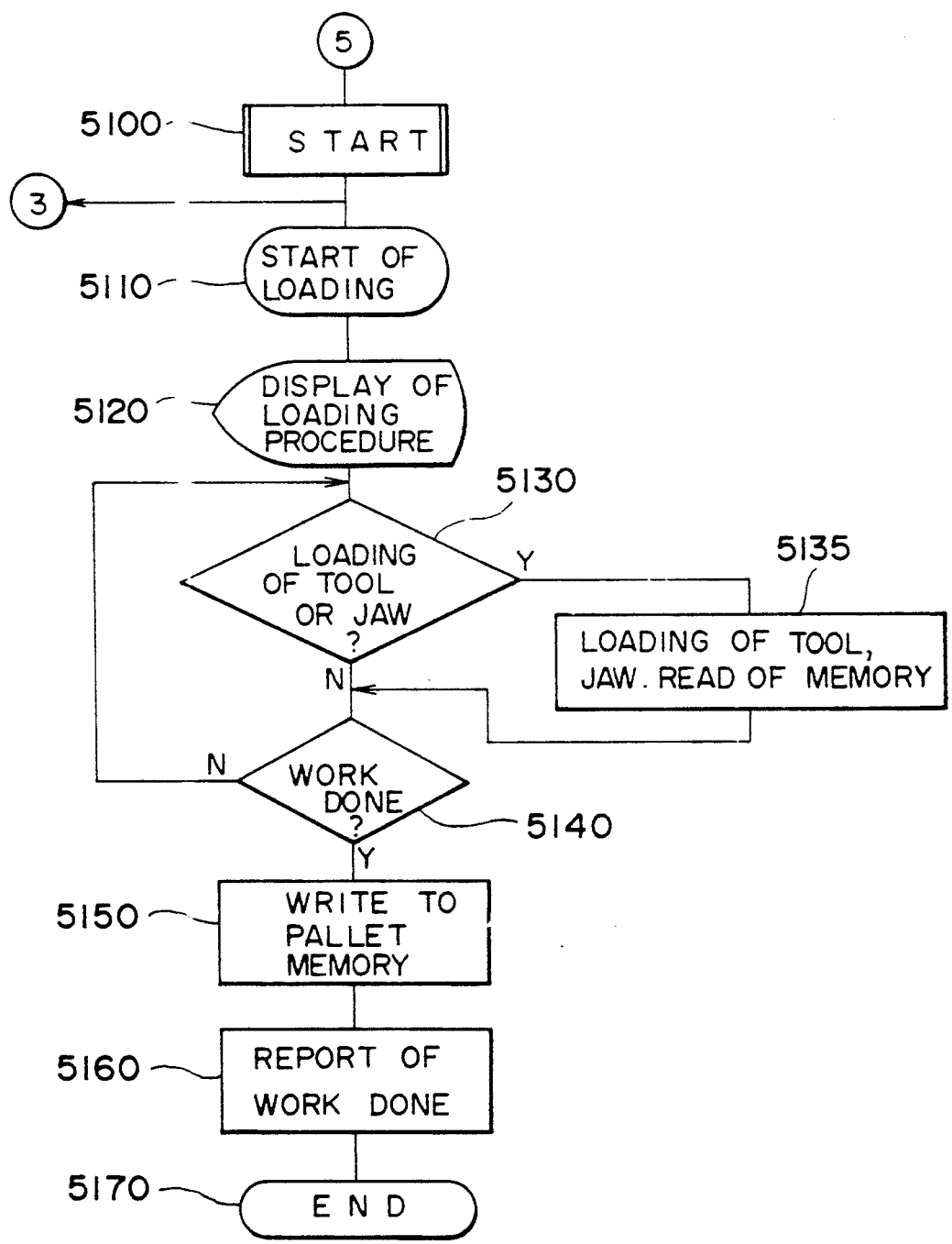

FIG. 23 and 23A shows the flow chart of control in the present system.

The routine of control started in the step 5000 preferentially checks the existence of the lathe cell with broken tool in step 5010.

When a cell with broken tool is found, the pallet with the alternative tool of the broken tool is referred, and the whereabouts of that pallet (in which of the stacked pallet in the specified stack of the stack yard it is contained) is specified. From step 5030 a routine for transferring the stacked pallet from the stack to the cell starts.

For example, when a breakage of the tool occurred inside the lathe, the steps for replacing it with the alternative tool in a hurry is as follows (see FIG. 22).

The host computer refers the tool data number of the alterable tool by referring to the tool control table (FIG. 20) based on the tool data of the broken tool such as the name of the tool, the size of the cutter, the cutting angle and the like.

When the tool data number is found, it refers the pallet number data by referring to the pallet condition table (FIG. 18).

When the pallet number is found, the whereabouts of that specified pallet (the stage of the stack in the stack yard) could be figured out from FIG. 17.

When there are not broken tools, it skips to step 6000 and checks the existence of the cell idle for machining. When there are cell idle for machining, the position of the stack where the stacked pallet which should be machined by that cell is stored is referred in step 6010, and the routine for transferring the pallet from the stack to the cell starts in step 6020. After that, it goes to step 5040.

The step 5040 controls the movement of the stacker crane. First, the stacker crane judges whether the preparation of the staring point is finished or not, and when it isn't finished, returns to step 5010.

When the preparation of the starting point is finished, it pulls out the pallet in step 5050, and checks the preparation of the station for receiving that pallet in step 5060. When the preparation of the station isn't finished, it changes the destination from the station to the stack in step 5065 and returns to step 5060.

When the preparation of the station for receiving pallet is finished, it pushes in the pallet to the goal in step 5070.

In step 5080, it judges whether that station for receiving pallet was the loading station or not. If the station for receiving pallet was other than the loading station, it returns to the step 5010 and repeats the process mentioned above. If the station for receiving pallet was the loading station, it advances to step 5100 and the routine for loading starts.

On the other hand, when there are no cell idle for machining in step 6000, it advances to step 6500 and checks the existence of the loading station idle for working.

When there are loading station idle for working, it advances to step 6510 and checks if there are requirements for supplying tool or chuck jaw from the cell. If there were such a requirement, it advances to step 6520 to refer the position of the pallet which should store the required tool or chuck jaw, and starts the routine for transferring the pallet to the loading station starts in step 6530.

When there are no loading station idle for working in step 6500, it advances to step 7200 and checks the existence of pallet to go-out at the unloading station in the cell. The pallet to go-out is a pallet with all of the work having been machined, or a pallet in the case where all of the pallets are being stacked to the unloading station without being machined and the like for some reason. When there are pallets to go-out, it advances to step 7210 and starts the routine for transferring the pallet from the cell to the stack.

When there are no machined pallets, it advances to step 7300 and checks if the operation of the loading station is finished or not. If the operation is finished, it advances to step 7310 and the routine for transferring the pallet from the loading station to the stack yard starts.

When the operation of the loading station isn't finished, it returns to the step 5010 and repeats the process mentioned above.

When there are no requirements for supplying the working tools in a loading station idle for working in step 6510, it advances to step 7000 and checks the existence of a work-piece for loading.

If there are work-pieces, the pallet which could load the work-piece is referred in step 7010. The pallet which could load said work-piece, or a pallet for that work-piece with machined work loaded. In the former pallet, only the loading of the work-piece is done, whereas the unloading of the machined work and the loading of the work-piece is done in the latter pallet.

The existence of the pallet for loading is checked in step 7020. When there are, it advances to step 6530 and the routine for transferring pallet to the loading station starts.

In the present flexible manufacturing system, various kinds of work-piece is being machined. Therefore, in practice, the process mentioned above is repeated for each kind of the work-pieces.

In the case where there are no work-piece to be loaded in step 7000, or the case where there are no pallet for loading in step 7020, it advances to step 7100 and checks the existence of the pallet in the stack of the stack yard with machined work still loaded.

If there were such a pallet, it advances to step 6530 to unload the machined work from the pallet, and the routine for transferring the pallet to the loading station starts.

If there were no such pallet, it advances to step 7200.

In the case where the station for receiving pallet in step 5080 is the loading station, it advances to step 5100 and starts loading. The main task returns to step 5010 and continues the process mentioned above.

The task for loading is as follows. The loading starts in step 5110 and the contents of the operation is displayed in step 5120. The contents of the operation is displayed in the display 60.

In step 5130, it judges whether the object of the loading is a tool, chuck jaw or not, and if it is tool or chuck jaw, it advances to step 5135 and the loading of the tool or chuck jaw and the reading of the memory element of the loaded tool or chuck jaw are carried out.

When the completion of the loading operation is confirmed in step 5140, the data of the loaded member is written in the memory element of the pallet in step 5150.

In step 5160, the operator reports the completion of the operation at the loading station to the system control device, and completes the operation in step 5170.

In the present flexible manufacturing system, the automatic manufacturing for, for example, 72 hours (3 days) could be achieved by controlling the devices consisting the system organically as mentioned above.

The flexible manufacturing system of the present invention equips the memory elements for memorizing data of the stored member to the pallet for storing members such as the work and working tools in a manufacturing system having a stack yard and an automatic machine tool. Therefore, unmatching of the member and the data could be prevented and the efficiency of the automatic manufacturing could be improved because the working tools used in the manufacturing system and the work to be machined moves in the system together with the data necessary for manufacturing.

The pallet for storing members is constructed in a stacked pallet which stacks ten pallets for example, and by regarding this stacked pallet as a unit when loading or working, various kinds of work could be automatically manufactured continuously for a long time.

The working tools used in the system are equipped with a memory element for memorizing data of itself. Therefore, installing of undesired working tool could be perfectly prevented because the system controls the working tools.

The operator carries out loading and unloading of the member to the pallet in the loading station. However, the details of the operation are instructed by the display so that accurate loading could be achieved easily.

The automatic machine tool is equipped with a stacker of the pallet and stockers of the working tools. These stockers function as a buffer so that, for example, working tools in the stacked pallet could be prepared to the stocker even while machining, therefore the time needed for automatic loading could be shortened.

The automatic machine tool with stacked pallet supplied automatically creates the working schedule by reading the data of the memory element of the pallet, and continues the automatic loading and automatic manufacturing according to the created working schedule.

We claim:

1. A flexible manufacturing system comprising:
machining tools and chuck jaws, said machining tools and chuck jaws each having a read/write memory device;
pallets, said pallets each having a read/write memory device for memorizing data concerning the pallet with which the read/write memory device is associated and for memorizing data concerning one or more members stored by said pallet which members include work pieces, said machining tools and said chuck jaws;
a numerical control machine tool which includes means for reading the memory of each pallet, and said numerical control machine tool further comprising means for receiving the work pieces, machining tools and chuck jaws supported by said pallets, means for transferring the work pieces, machining tools and chuck jaws from said pallets to said means for receiving, and means for working the work pieces received by said receiving means;
a loading station with a reading/writing device for reading/writing the memory of said pallets, and a display for facilitating a setting up of said pallets with said members in accordance with data provided in the memory of said pallets;
a stacker crane for transferring pallets among the numerical control machine and loading station; and
a controller which includes means for storing the data for each tool or chuck jaw and means for revising said storing means with present status data of each tool or chuck jaw in the flexible manufacturing system.

2. A flexible manufacturing system as recited in claim 1 further comprising a comparison device for comparing the data in the memory of each machining tool or chuck jaw in a supporting one of said pallets with the data presently in the memory of said supporting pallet concerning said one or more members.

3. A flexible manufacturing system as recited in claim 1 wherein said numerical control machine tool includes a first read/write head which is specifically adapted for use with said chuck jaws, and a second read/write head which is specifically adapted for use with said machining tools.

4. A flexible manufacturing system, as recited in claim 1 further comprising a stacker yard with a plurality of stacker shelves and said stacker crane including means for supplying said stacker shelves with pallets from said loading station and means for supplying said numerical control machine tool with pallets from said stacker shelves.

5. A flexible manufacturing system, as recited in claim 1 wherein said pallets are arranged in groups of stacked pallets when being supplied to said stacker shelves.

6. A flexible manufacturing system, as recited in claim 1 wherein said pallets are arranged in stacked groups with each group of pallets includes pallets storing work pieces and additional pallets storing tools of chuck jaws for use with said work pieces.

7. A flexible manufacturing system, as recited in claim 1 wherein said transferring means of said numerical control machine tool includes a transfer robot for transferring tools or chuck jaws to said means for receiving.

8. A flexible manufacturing system, as recited in claim 7 wherein said transferring means includes a stocker device which supports a plurality of machining tools and chuck jaws adapted for pick up by said transfer robot.

9. A flexible manufacturing system, as recited in claim 1 wherein said transferring means of said numerical control machine tool includes a transfer robot for transferring tools or chuck jaws, to said numerical control machine tool.

10. A flexible manufacturing system, as recited in claim 9 wherein said transferring means includes a stocker device which supports a plurality of machining tools and chuck jaws adapted for pick up by said transfer robot.

11. A flexible manufacturing system comprising:
machining tools and chuck jaws each having a read/write memory device;
pallets, said pallets each having a read/write memory device for memorizing data concerning the pallet with which said read/write device is associated and for memorizing data concerning one or more members supported by said pallets which members include work pieces, said machining tools and said chuck jaws;
a numerical control machine tool which includes means for reading the memory of each of said pallets, and said numerical control machine tool further comprising means for receiving work pieces, machining tools and chuck jaws supported by said pallets, and means for transferring the work pieces, machining tools and chuck jaws from said pallets to said receiving means according to the data contained in the memory of each supporting pallet;
a stacker structure for supporting a plurality of pallets;
a stacker crane for transferring pallets to and from said stacker structure, said loading station and said numerical control machine tool; and
a controller which manages control tables for storing data associated with said members and revises the control tables with present status data for each of said machining tools or chuck jaws in the flexible manufacturing system.

12. A flexible manufacturing system, as recited in claim 11 further comprising a comparison device for comparing the data in the memory of each machining tool or chuck jaw in a supporting one of said pallets with the data presently in the memory of said supporting pallet concerning said one or more members.

13. A flexible manufacturing system, as recited in claim 11 wherein said numerical control machine tool includes a first read/write head which is specifically adapted for use with said chuck jaws, and a second read/write head which is specifically adapted for use with said machining tools.

14. A flexible manufacturing system, as recited in claim 11 wherein said transferring means of said numerical control machine tool includes a transfer robot for transferring tools or chuck jaws to said receiving means.

15. A flexible manufacturing system, as recited in claim 14 wherein said transferring means includes a stocker device which supports a plurality of machining tools and chuck jaws adapted for pick up by said transfer robot.

16. A flexible manufacturing system, comprising:
machining tools and chuck jaws each having a read/write memory device;
pallets, each of said pallets having an associated read/write memory device for memorizing data concerning the pallet with which said read/write device is associated and for memorizing data concerning one or more members which are supported by said pallets which members include work pieces, said work machining tools and said chuck jaws;
pallet groups each formed of a plurality of stacked pallets;
a stack yard for storing pallet groups;
a numerical control machine tool adapted to receive at least one pallet from one of said pallet groups, said numerical control machine tool including means for reading the memory of respective ones of said pallets, and said numerical control machine tool further comprising means for receiving said work pieces, machining tools and chuck jaws supported by said pallets and means for transferring the work pieces, machining tools and chuck jaws from said pallets to said means for receiving;
a loading station which includes a reading/writing device for reading and writing the memory of said pallets, said loading station including a display for facilitating a setting up of pallets with at least one predetermined member taken from a group of said machining tools and chuck jaws in accordance with the memory of the pallet to receive said at least one member;
a stacker crane for transferring single pallets or said groups of said pallets among said stack yard, said loading station, and said numerical control machine tool, said stacker crane having means for stacking individual pallets on to a pallet groups and picking up a pallet in accordance with the data contained in the memory of the pallet being picked up; and
a controller which includes means for storing data concerning said tools and chuck jaws, managing the data stored on said tools and chuck jaws and updating said storing means with present status data for each of said machining tools and chuck jaws in said flexible manufacturing system.

17. A flexible manufacturing system, as recited in claim 16 further comprising a comparison device for comparing the data in the memory of each machining tool or chuck jaw in a supporting one of said pallets with the data presently in the memory of said supporting pallet concerning said one or more members.

18. A flexible manufacturing system, as recited in claim 16 wherein said numerical control machine tool includes a first read/write head which is specifically adapted for use with said chuck jaws, and a second read/write head which is specifically adapted for use with said machining tools.

* * * * *